US012237743B2

(12) United States Patent
Madbouly et al.

(10) Patent No.: US 12,237,743 B2
(45) Date of Patent: Feb. 25, 2025

(54) POLYMERIC MATERIALS

(71) Applicant: Schlumberger Technology Corporation, Sugar Land, TX (US)

(72) Inventors: Samy A Madbouly, Katy, TX (US); Jason Holzmueller, Lawrence, KS (US); William Goertzen, Lawrence, KS (US); Gregory Howard Manke, Overland Park, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/402,091

(22) Filed: Jan. 2, 2024

(65) Prior Publication Data

US 2024/0136879 A1  Apr. 25, 2024

Related U.S. Application Data

(60) Continuation of application No. 17/333,906, filed on May 28, 2021, now Pat. No. 11,901,785, which is a
(Continued)

(51) Int. Cl.
*H02K 3/30* (2006.01)
*E21B 43/12* (2006.01)
(Continued)

(52) U.S. Cl.
CPC .............. *H02K 3/30* (2013.01); *E21B 43/128* (2013.01); *E21B 47/008* (2020.05); *E21B 47/07* (2020.05);
(Continued)

(58) Field of Classification Search
CPC ........ H01B 3/427; H01B 3/307; E21B 43/128
See application file for complete search history.

(56) References Cited

U.S. PATENT DOCUMENTS 3,246,627 A  4/1966 Loeb
3,600,216 A  8/1971 Stewart
(Continued)

FOREIGN PATENT DOCUMENTS

CN  202339734  7/2012
JP  2001309599 A  11/2001
(Continued)

OTHER PUBLICATIONS

Lee, B. et al., "Thermally conductive and electrically insulating EVA composite encapsulants for solar photovoltaic (PV) cell", eXPRESS Polymer Letters, 2008, 2(5), pp. 357-363.
(Continued)

*Primary Examiner* — Hoa C Nguyen
*Assistant Examiner* — Amol H Patel
(74) *Attorney, Agent, or Firm* — Philippe Laguerre

(57) ABSTRACT

A submersible component can include a conductor; and a polymeric material disposed about at least a portion of the conductor where the polymeric material includes at least approximately 50 percent by weight polyether ether ketone (PEEK) and at least 5 percent by weight perfluoroalkoxy alkanes (PFA). A submersible electrical unit can include an electrically conductive winding; and a polymeric composite material disposed about at least a portion of the electrically conductive winding where the polymeric composite material includes polymeric material at at least approximately 40 percent by volume and one or more fillers at at least approximately 10 percent by volume.

20 Claims, 25 Drawing Sheets

Related U.S. Application Data continuation of application No. 16/585,678, filed on Sep. 27, 2019, now Pat. No. 11,025,118, which is a division of application No. 15/227,737, filed on Aug. 3, 2016, now abandoned.

(51) Int. Cl.

| | | |
|---|---|---|
| *E21B 47/008* | (2012.01) | |
| *E21B 47/07* | (2012.01) | |
| *H01B 3/30* | (2006.01) | |
| *H01B 3/42* | (2006.01) | |
| *H02K 3/34* | (2006.01) | |
| *H02K 5/132* | (2006.01) | |

(52) U.S. Cl.
CPC ............ *H01B 3/307* (2013.01); *H01B 3/427* (2013.01); *H02K 3/34* (2013.01); *H02K 3/345* (2013.01); *H02K 5/132* (2013.01)

(56) References Cited

U.S. PATENT DOCUMENTS

| | | |
|---|---|---|
| 4,163,828 A | 8/1979 | Mahoney |
| 4,396,658 A | 8/1983 | Mettes et al. |
| 4,412,028 A | 10/1983 | Lundberg et al. |
| 5,075,174 A | 12/1991 | Pyle |
| 5,110,685 A | 5/1992 | Cross et al. |
| 5,459,202 A | 10/1995 | Martinez et al. |
| 5,461,107 A | 10/1995 | Amin et al. |
| 5,654,084 A | 8/1997 | Egert |
| 6,488,992 B1 | 12/2002 | Boerio et al. |
| 6,863,124 B2 | 3/2005 | Araux et al. |
| 7,373,991 B2 | 5/2008 | Vaidya et al. |
| 7,455,106 B2 | 11/2008 | Veneruso et al. |
| 7,714,231 B2 | 5/2010 | Varkey et al. |
| 8,318,876 B1 | 11/2012 | Larock et al. |
| 8,567,494 B2 | 10/2013 | Rytlewski et al. |
| 8,604,656 B2 | 12/2013 | Goertzen et al. |
| 8,776,359 B2 | 7/2014 | Varkey et al. |
| 9,068,063 B2 | 6/2015 | Helmer et al. |
| 9,638,021 B2 | 5/2017 | Varkey et al. |
| 2006/0149005 A1 | 7/2006 | Minaba |
| 2007/0051510 A1 | 3/2007 | Veneruso et al. |
| 2008/0191575 A1 | 8/2008 | Varkey et al. |
| 2010/0151242 A1 | 6/2010 | Boehm |
| 2012/0269660 A1 | 10/2012 | Mn et al. |
| 2012/0282120 A1 | 11/2012 | Krahn et al. |
| 2013/0131252 A1 | 5/2013 | Fukumori |
| 2013/0200745 A1 | 8/2013 | Knapp |
| 2014/0152155 A1 | 6/2014 | Flett |
| 2014/0158380 A1 | 6/2014 | Varkey et al. |
| 2016/0042836 A1 | 2/2016 | Okabe et al. |
| 2016/0125972 A1* | 5/2016 | Arii .................. C08G 10/04 |
| | | 525/472 |
| 2016/0233003 A1* | 8/2016 | Caudill ................ H01B 3/081 |
| 2016/0294243 A1 | 10/2016 | Duan |
| 2016/0325994 A1* | 11/2016 | Qu .................... C10M 125/26 |
| 2018/0262074 A1 | 9/2018 | Duan |
| 2019/0119449 A1 | 4/2019 | Sheth |
| 2020/0028399 A1 | 1/2020 | Madbouly et al. |
| 2020/0032046 A1* | 1/2020 | Osawa .................... C08L 63/10 |
| 2021/0202134 A1 | 7/2021 | Jouanneau |
| 2021/0288541 A1 | 9/2021 | Madbouly |
| 2023/0083970 A1* | 3/2023 | Said ...................... H02K 3/30 |
| | | 174/110 R |

FOREIGN PATENT DOCUMENTS

| | | |
|---|---|---|
| WO | 2013086079 A1 | 6/2013 |
| WO | 2016032469 A1 | 3/2016 |
| WO | 2016049244 A1 | 3/2016 |
| WO | 2016089938 A1 | 6/2016 |
| WO | 2023064569 A1 | 4/2023 |

OTHER PUBLICATIONS

International Search Report and Written Opinion issued in the PCT Application PCT/US2015/063319 dated Feb. 26, 2016 (17 pages).
International Preliminary Report on Patentability issued in the PCT Application PCT/US2015/063319 dated Jun. 6, 2017 (14 pages).
International Search Report and Written Opinion issued in the PCT Application PCT/US2022/046727 dated Feb. 9, 2023 (11 pages).
Matejka et al., 1985, Polymerization of dicyclopentadiene: A new reaction injection molding system, J Appl Poly Sci 1985; 30: 2787-2803.
Grubbs, et al., "Ring-Opening Metathesis Polymerization Catalysts" Polymer Preprints, 35(1),p. 688 (1994).
Kessler et al., Self-activated healing of delamination damage in woven composites, Composites Part A 2001; 32: 683-99.
Brown et al., Fracture testing of a self-healing polymer composite, Exp Mech 2002; 42: 372-9.
Kessler et al., Cure kinetics of the ring-opening metathesis polymerization of dicyclopentadiene, J Polym Sci Part A Polym Chem 2002; 40: 2373-83.
Brown et al., Microcapsule induced toughening in a self-healing polymer composite, J Mater Sci 2004; 39: 1703-10.
Rule et al., Wax-Protected Catalyst Microspheres for Efficient Self-Healing Materials, JS. Adv Mater 2005; 17: 205-8.
Brown et al., Retardation and repair of fatigue cracks in a microcapsule toughened epoxy composite—Part II: In situ self-healing, Compos Sci Techol 2005; 65: 2474-80.
International Search Report and Written Opinion of the PCT Application No. PCT/US2022/046757 dated Feb. 22, 2023, 11 pages.

* cited by examiner

POLYMERIC MATERIALS

CROSS-REFERENCE TO RELATED APPLICATIONS

This application is a continuation application of U.S. application Ser. No. 17/333,906 filed May 28, 2021, which is a continuation of U.S. application Ser. No. 16/585,678 filed Sep. 27, 2019, which is a divisional application of U.S. application Ser. No. 15/227,737 filed Aug. 3, 2016, the entire contents of each are hereby incorporated by reference.

BACKGROUND

A conductor can conduct electricity or, for example, electromagnetic energy (e.g., consider an optical fiber). A conductor can be coated with a material that acts to insulate the conductor. As an example, such a material may be a dielectric material, which may be, for example, a polymeric material. As an example, a polymeric material may be suitable for use as a varnish and/or an encapsulant. For example, consider a magnet wire varnish and an electric motor stator encapsulant.

SUMMARY

A submersible component can include a conductor; and a polymeric material disposed about at least a portion of the conductor where the polymeric material includes at least approximately 50 percent by weight polyether ether ketone (PEEK) and at least 5 percent by weight perfluoroalkoxy alkanes (PFA). A submersible electrical unit can include an electrically conductive winding; and a polymeric composite material disposed about at least a portion of the electrically conductive winding where the polymeric composite material includes polymeric material at at least approximately 40 percent by volume and one or more fillers at at least approximately 10 percent by volume. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
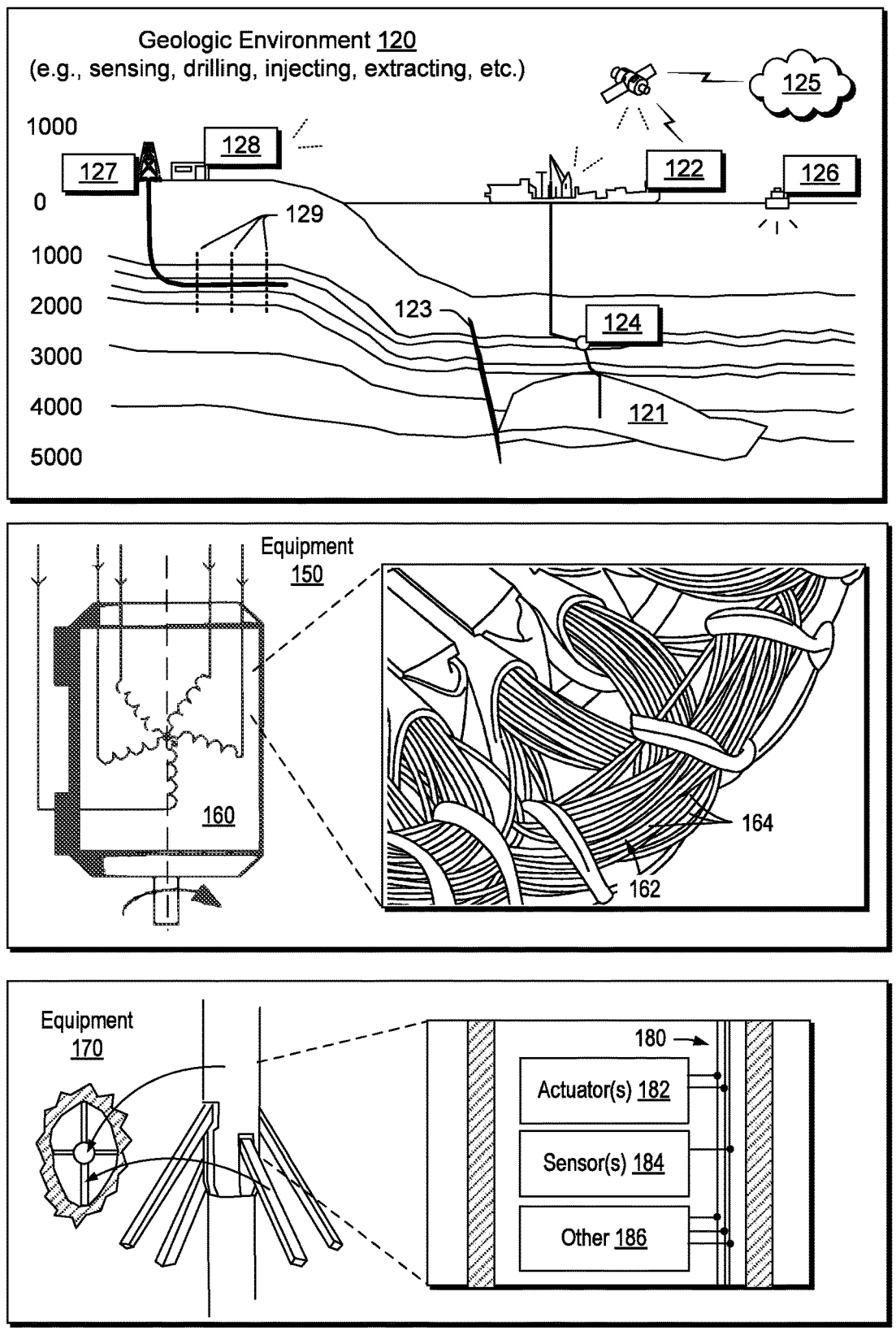
FIG. 1 illustrates examples of equipment in geologic environments.

FIG. 1 shows an example of a geologic environment 120 and examples of equipment 150 and 170. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the equipment 150, an electric motor 160 can include bundles 162 of wires 164. For example, the wires 164 can be magnet wires. Magnet wire can include electrically conductive material such as an electrically conductive metal or alloy material. For example, consider copper or aluminum as electrically conductive material. As an example, magnet wire can be insulated with a layer or layers of insulation or insulations. As an example, magnet wire may be used to construct various types of equipment such as, for example, transformers, inductors, motors, speakers, hard disk head actuators, electromagnets, and other applications that can include coils of insulated wire. As an example, magnet wire may be electrically insulated with material that is extruded, taped, etc. As an example, magnet wire can be wound to form a winding such as, for example, a phase winding of a stator, which may be, for example, vacuum impregnated with an insulating varnish to improve insulation strength and long-term reliability of the winding. As an example, materials can include an electrically insulating material, a varnish material and/or an encapsulating material.

As an example, magnet wire may have a round cross section, a rectangular cross section, a hexagonal cross section (e.g., with rounded corners) or one or more types of cross sections, which may provide for one or more of packing efficiency, structural stability, thermal conductivity, etc.

As shown in the example of FIG. 1, the electric motor 160 may be a multiphase electric motor (e.g., a polyphase electric motor). For example, polyphase power may be delivered via one or more power cables to drive an induction motor where the polyphaser power generates a rotating magnetic field. As an example, where a three-or-more-phase supply completes one full cycle, a magnetic field of a two-poles-per-phase motor can be rotated through 360 degrees in physical space. As an example, a motor may be a single-phase motor. As an example, a motor may be an AC motor. As an example, a motor may be a DC motor.

As to the equipment 170, it can include one or more conductors 180 that may be operatively coupled to one or more actuators 182, one or more sensors 184 and/or one or more other types of electrical components 186 (e.g., electrical, electro-mechanical, electro-chemical, electro-fluidic, etc.). As an example, one or more polymeric materials, optionally one or more polymeric composite materials, may be utilized in the equipment 170 and/or in one or more components (e.g., cables, sensors, etc.) operatively coupled to the equipment 170.

As an example, equipment can include wireline equipment. For example, consider equipment that is operatively coupled to an electrical cable that can lower the equipment into a borehole where the equipment may also include transmission circuitry that can transmit and/or receive information via the electrical cable.

As an example, a wireline operation can include using single-strand and/or multi-strand wire or cable for intervention in a borehole (e.g., consider oil and/or gas wells). As an example, a wireline operation can include electric logging via one or more cables that include electrical conductors.

As an example, the equipment 150 may be or include artificial lift equipment. For example, the electric motor 160 may be an electric motor of an electric submersible pump (e.g., an ESP). In such an example, a cable or cables may extend from surface equipment to the equipment 150, for example, to provide power, to carry information, to sense information, etc.

As an example, equipment can include an electric downhole motor, an electric downhole wireline tool (e.g., or slickline tool), a cable, etc.

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over an extended period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

As an example, an environment may be a harsh environment, for example, an environment that may be classified as being a high-pressure and high-temperature environment (HPHT). A so-called HPHT environment may include pressures up to about 138 MPa (e.g., about 20,000 psi) and temperatures up to about 205 degrees C. (e.g., about 400 degrees F. and about 480 K), a so-called ultra-HPHT environment may include pressures up to about 241 MPa (e.g., about 35,000 psi) and temperatures up to about 260 degrees C. (e.g., about 500 degrees F. and about 530 K) and a so-called HPHT-hc environment may include pressures greater than about 241 MPa (e.g., about 35,000 psi) and temperatures greater than about 260 degrees C. (e.g., about 500 degrees F. and about 530 K). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more; about 370 K or more).

As mentioned, magnet wire may be part of equipment and/or operatively coupled to equipment. As to motorized equipment, various examples of electric submersible pump (ESP) equipment are described; noting that magnet wire or other relatively small gauge wire can be utilized in and/or in association with one or more types of equipment.

Figure 2:
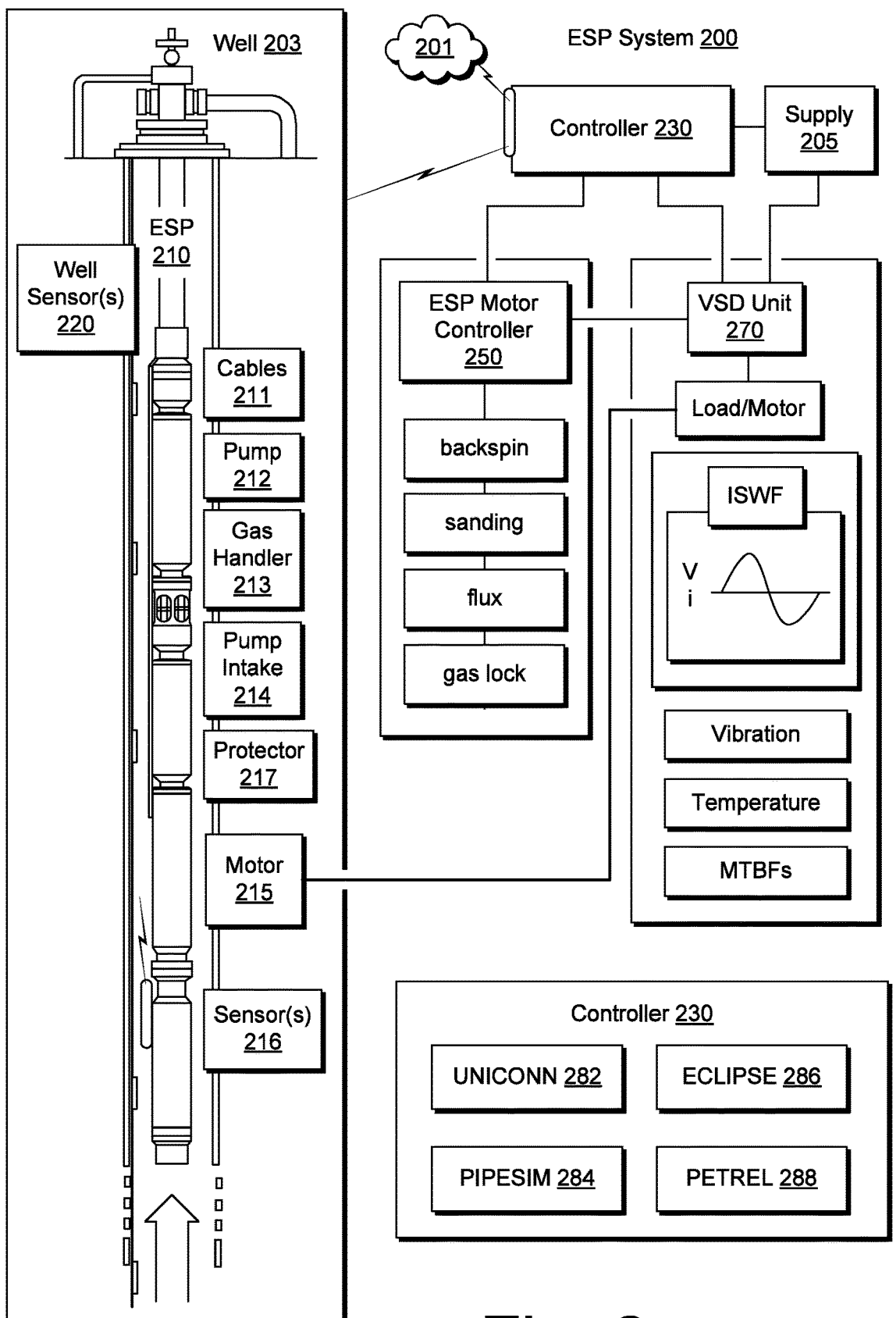
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years).

In the example of FIG. 2, the ESP system 200 includes a network 201, a well 203 disposed in a geologic environment (e.g., with surface equipment, etc.), a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, strain, current leakage, vibration, etc.) and a protector 217.

As an example, an ESP may include a REDA™ HOTLINE™ high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

As an example, the one or more sensors 216 of the ESP 210 may be part of a digital downhole monitoring system. For example, consider the commercially available PHOENIX™ MULTISENSOR XT150 system marketed by Schlumberger Limited (Houston, Texas). A monitoring system may include a base unit that operatively couples to an ESP motor (see, e.g., the motor 215), for example, directly, via a motor-base crossover, etc. As an example, such a base unit (e.g., base gauge) may measure intake pressure, intake temperature, motor oil temperature, motor winding temperature, vibration, currently leakage, etc. As explained with respect to FIG. 4, a base unit may transmit information via a power cable that provides power to an ESP motor and may receive power via such a cable as well.

As an example, a remote unit may be provided that may be located at a pump discharge (e.g., located at an end opposite the pump intake 214). As an example, a base unit and a remote unit may, in combination, measure intake and discharge pressures across a pump (see, e.g., the pump 212), for example, for analysis of a pump curve. As an example, alarms may be set for one or more parameters (e.g., measurements, parameters based on measurements, etc.).

Where a system includes a base unit and a remote unit, such as those of the PHOENIX™ MULTISENSOR XT150 system, the units may be linked via wires. Such an arrangement provide power from the base unit to the remote unit and allows for communication between the base unit and the remote unit (e.g., at least transmission of information from the remote unit to the base unit). As an example, a remote unit is powered via a wired interface to a base unit such that one or more sensors of the remote unit can sense physical phenomena. In such an example, the remote unit can then transmit sensed information to the base unit, which, in turn, may transmit such information to a surface unit via a power cable configured to provide power to an ESP motor.

In the example of FIG. 2, the well 203 may include one or more well sensors 220, for example, such as the commercially available OPTICLINE™ sensors or WELLWATCHER BRITEBLUE™ sensors marketed by Schlumberger Limited (Houston, Texas). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend a considerable distance into a well and possibly beyond a position of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UNICONN™ motor controller 282 marketed by Schlumberger Limited (Houston, Texas). In the example of FIG. 2, the controller 230 may access one or more of the PIPESIM™ framework 284, the ECLIPSE™ framework 286 marketed by Schlumberger Limited (Houston, Texas) and the PETREL™ framework 288 marketed by Schlumberger Limited (Houston, Texas) (e.g., and optionally the OCEAN™ framework marketed by Schlumberger Limited (Houston, Texas)).

In the example of FIG. 2, the motor controller 250 may be a commercially available motor controller such as the UNICONN™ motor controller. The UNICONN™ motor controller can connect to a SCADA system, the ESPWATCHER™ surveillance system, etc. The UNICONN™ motor controller can perform some control and data acquisition tasks for ESPs, surface pumps or other monitored wells. As an example, the UNICONN™ motor controller can interface with the aforementioned PHOENIX™ monitoring system, for example, to access pressure, temperature and vibration data and various protection parameters as well as to provide direct current power to downhole sensors. The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SPEEDSTAR™ MVD control circuitry marketed by Schlumberger Limited (Houston, Texas).

Figure 3:
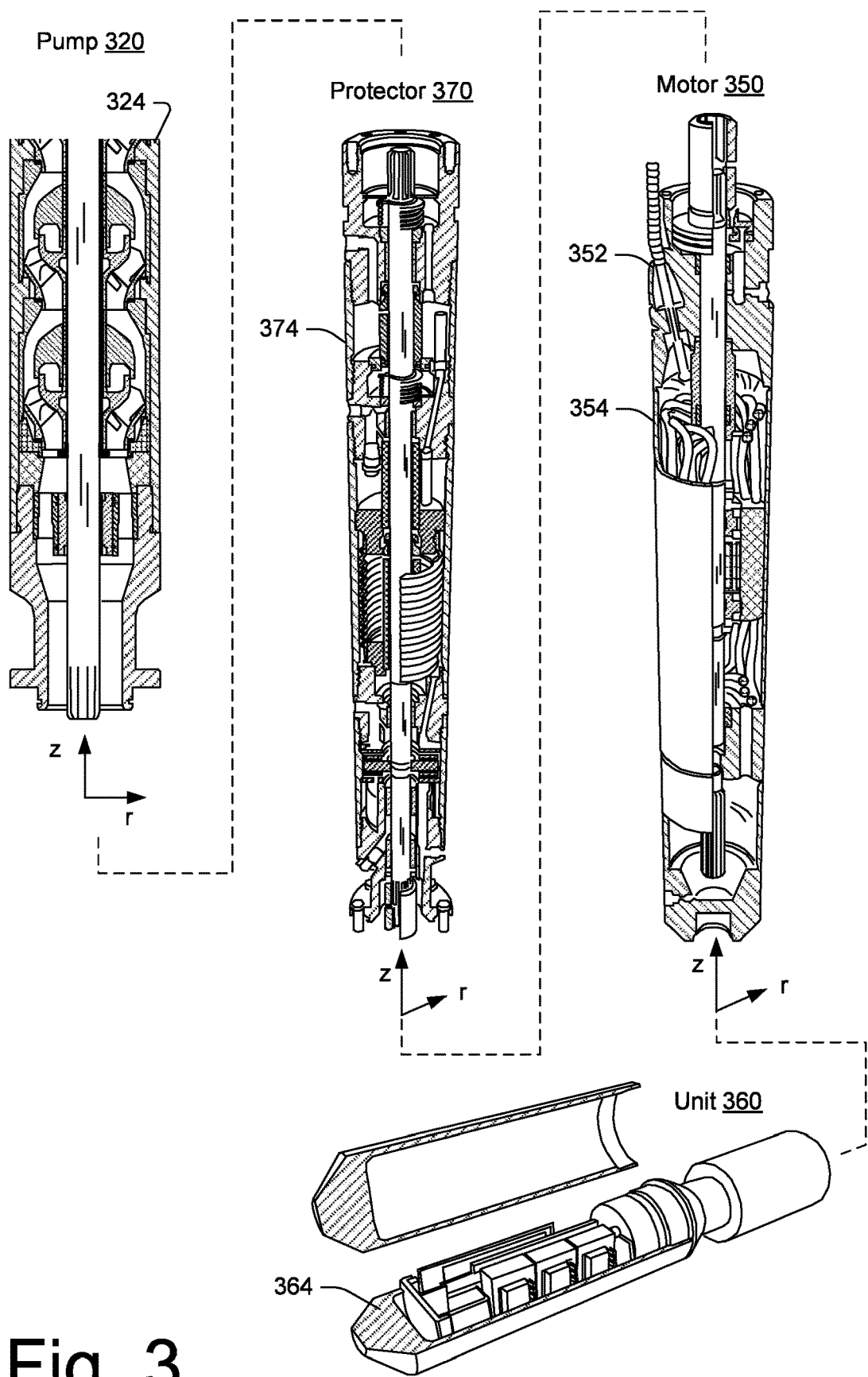
FIG. 3 illustrates examples of equipment.

FIG. 3 shows cut-away views of examples of equipment such as, for example, a portion of a pump 320, a protector 370, a motor 350 of an ESP and a sensor unit 360. In the examples of FIG. 3, each of the pieces of equipment may be considered to be assemblies that, for example, can be operatively coupled to form a system (e.g., an ESP or ESP system). In FIG. 3, the pump 320, the protector 370, the motor 350 and the sensor unit 360 are shown with respect to cylindrical coordinate systems (e.g., r, z, Θ). Various features of equipment may be described, defined, etc. with respect to a cylindrical coordinate system. As an example, a lower end of the pump 320 may be coupled to an upper end of the protector 370, a lower end of the protector 370 may be coupled to an upper end of the motor 350 and a lower end of the motor 350 may be coupled to an upper end of the sensor unit 360 (e.g., via a bridge or other suitable coupling).

As shown in FIG. 3, a shaft segment of the pump 320 may be coupled via a connector to a shaft segment of the protector 370 and the shaft segment of the protector 370 may be coupled via a connector to a shaft segment of the motor 350. As an example, an ESP may be oriented in a desired direction, which may be vertical, horizontal or other angle (e.g., as may be defined with respect to gravity, etc.). Orientation of an ESP with respect to gravity may be considered as a factor, for example, to determine ESP features, operation, etc.

As shown in FIG. 3, the motor 350 is an electric motor that includes a connector 352, for example, to operatively couple the electric motor to a multiphase power cable, for example, optionally via one or more motor lead extensions. Power supplied to the motor 350 via the connector 352 may be further supplied to the sensor unit 360, for example, via a wye point of the motor 350 (e.g., a wye point of a multiphase motor).

As an example, a connector may include features to connect one or more transmission lines, optionally dedicated to a monitoring system. For example, the connector 352 may include a socket, a pin, etc., that can couple to a transmission line dedicated to the sensor unit 360. As an example, the sensor unit 360 can include a connector that can connect the sensor unit 360 to a dedicated transmission line or lines, for example, directly and/or indirectly.

As an example, the motor 350 may include a transmission line jumper that extends from the connector 352 to a connector that can couple to the sensor unit 360. Such a transmission line jumper may be, for example, one or more conductors, twisted conductors, an optical fiber, optical fibers, a waveguide, waveguides, etc. As an example, the motor 350 may include a high-temperature optical material that can transmit information. In such an example, the optical material may couple to one or more optical transmission lines and/or to one or more electrical-to-optical and/or optical-to-electrical signal converters.

In the examples of FIG. 3, one or more coated electrical conductors may be present. For example, the pump 320 may include one or more coated electrical conductors operatively coupled to and/or part of sensor circuitry and/or another type of circuitry; the protector 370 may include one or more coated electrical conductors operatively coupled to and/or part of sensor circuitry and/or another type of circuitry; the motor 350 may include one or more coated electrical conductors operatively coupled to and/or part of sensor circuitry, electric motor circuitry and/or another type of circuitry; and the unit 360 may include one or more coated electrical conductors operatively coupled to and/or part of sensor circuitry and/or another type of circuitry.

In the examples of FIG. 3, the pump 320 can include a housing 324, the protector 370 can include a housing 374, the motor 350 can include a housing 354 and the unit 360 can include a housing 364. In such examples, a housing can include opposing ends, a longitudinal axis, an axial length defined between the opposing ends, a maximum transverse dimension that is less than the length and an interior space. As an example, circuitry may be disposed at least in part in the interior space. As an example, a coated electrical conductor can be electrically coupled to such circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer.

As an example, an interior space of an assembly may be sealed via one or more seal elements, joints, etc. As an example, the equipment 150 of FIG. 1 can include a sealed motor or a motor included in a sealed housing. As an example, the equipment 170 of FIG. 1 can include a sealed housing that aims to protect the one or more actuators 182, the one or more sensors 184 and/or the one or more other components from fluid in a downhole environment. As an example, the one or more conductors 180 may include one or more coated electrical conductors. As an example, the equipment 150 and/or the equipment 170 can be assemblies that include a coated electrical conductor electrically coupled to circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer.

As to the pump 320, the motor 350, the unit 360 and the protector 370 of FIG. 3, these may be individual assemblies that include a coated electrical conductor electrically coupled to circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer. As an example, one or more of such assemblies can include one or more sealed interior spaces, for example, consider a housing that includes one or more seal elements, one or more joints, etc. that aim to protect circuitry, etc., in the interior space or spaces from fluid in a downhole environment. As an example, an assembly can include an encapsulant or encapsulating material in an interior space. As an example, an assembly can include a specialized fluid in an interior space (e.g., a dielectric oil, etc.).

As an example, where water and/or gas (e.g., $CO_2$, $H_2S$) penetrates a housing and enters an interior space, a coated electrical conductor can include an electrical conductor that includes copper and a length defined by opposing ends, a polymeric electrical insulation layer disposed about at least a portion of the length of the electrical conductor, and a barrier layer disposed about at least a portion of the polymeric electrical insulation layer where the barrier layer acts to protect the polymeric electrical insulation layer from the water and/or gas. In such an example, the barrier layer may prolong the useful life (e.g., operational life) of an assembly.

Figure 4:
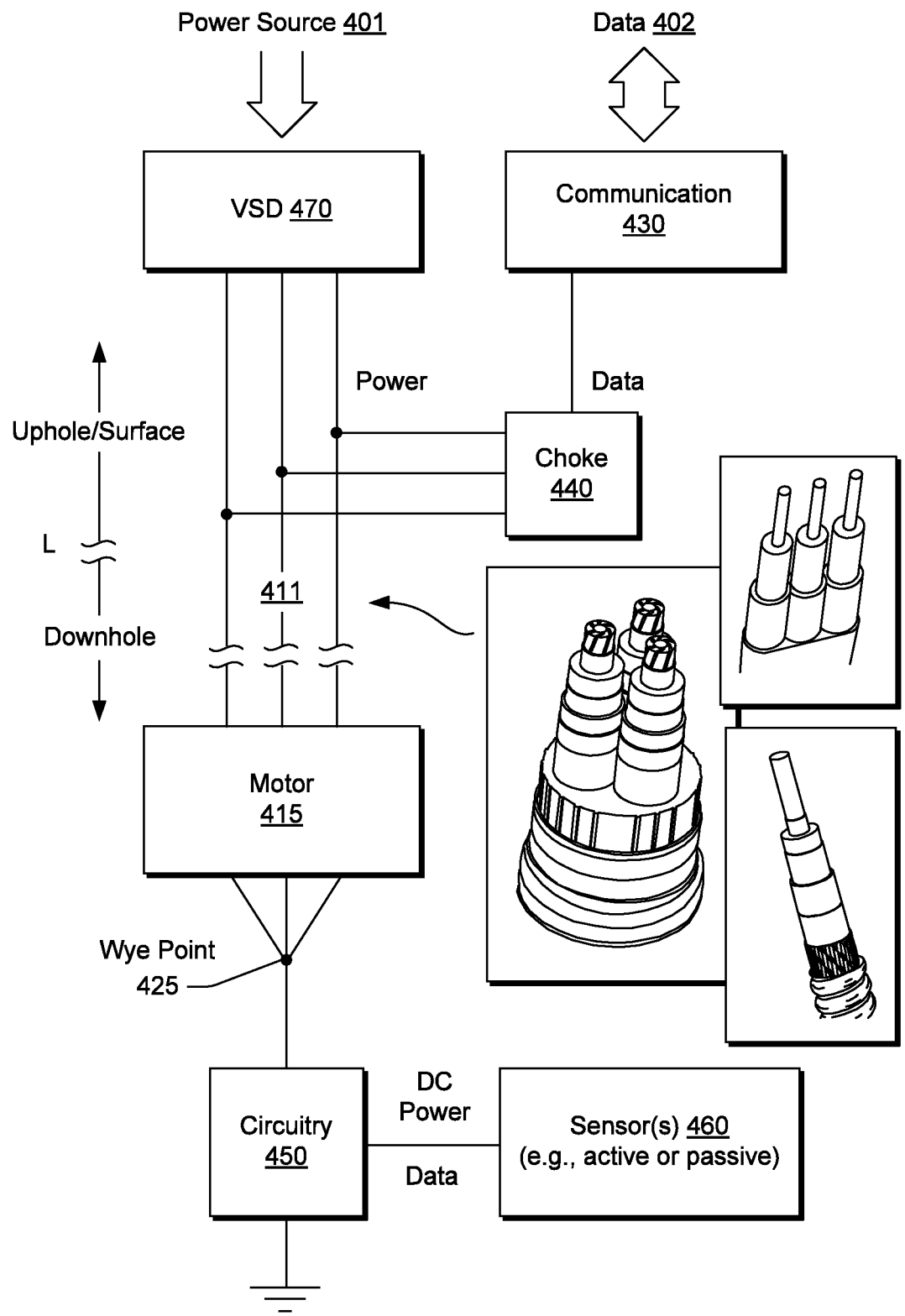
FIG. 4 illustrates an example of a system that includes a motor.

FIG. 4 shows a block diagram of an example of a system 400 that includes a power source 401 as well as data 402 (e.g., information). The power source 401 provides power to a VSD block 470 while the data 402 may be provided to a communication block 430. The data 402 may include instructions, for example, to instruct circuitry of the circuitry block 450, one or more sensors of the sensor block 460, etc. The data 402 may be or include data communicated, for example, from the circuitry block 450, the sensor block 460, etc. In the example of FIG. 4, a choke block 440 can provide for transmission of data signals via a power cable 411 (e.g., including motor lead extensions "MLEs"). A power cable may be provided in a format such as a round format or a flat format with multiple conductors. MLEs may be spliced onto a power cable to allow each of the conductors to physically connect to an appropriate corresponding connector of an electric motor (see, e.g., the connector 352 of FIG. 3). As an example, MLEs may be bundled within an outer casing (e.g., a layer of armor, etc.).

As shown, the power cable 411 connects to a motor block 415, which may be a motor (or motors) of an ESP and be controllable via the VSD block 470. In the example of FIG. 4, the conductors of the power cable 411 electrically connect at a wye point 425. The circuitry block 450 may derive power via the wye point 425 and may optionally transmit, receive or transmit and receive data via the wye point 425. As shown, the circuitry block 450 may be grounded.

As an example, a cable as in FIG. 4 can include multiple conductors where each conductor can carry current of a phase of a multiphase power supply for a multiphase electric motor. In such an example, a conductor may be in a range from about 8 AWG (about 3.7 mm) to about 00 AWG (about 9.3 mm).

TABLE 1

Examples of some components.

| Cable Component | Dimensions |
| --- | --- |
| Conductor (Cu) | 8 AWG to 00 AWG (3.7 mm to 9.3 mm) |
| Insulation | 58 mils to 130 mils (1.5 mm to 3.3 mm) |
| Lead (Pb) | 20 mils to 60 mils (0.5 mm to 1.5 mm) |
| Jacket over Lead (Pb) | 20 mils to 85 mils (0.5 mm to 2.2 mm) |
| Armor (e.g., optional) | 10 mils to 120 mils (0.25 mm to 3.0 mm) |
| Polymeric Coat (e.g., optional) | 20 mils to 60 mils (0.5 mm to 1.5 mm) |

As an example, a cable as in FIG. 4 may include conductors for delivery of power to a multiphase electric motor with a voltage range of about 3 kV to about 8 kV. As an example, a cable may carry power, at times, for example, with amperage of up to about 200 A or more. As an example, a cable may carry current to power a multiphase electric motor or other piece of equipment (e.g., downhole equipment powerable by a cable).

As noted above, in the example of FIG. 4, a conductor may be in a range from about 8 AWG (about 3.3 mm) to about 00 AWG (about 9.3 mm). As to magnet wire or other type of wire that may be insulated, a conductor may be in a range from about 28 AWG (about 0.3 mm) to about 1 AWG (about 7.3 mm). As mentioned, magnet wire may be used in construction of an electric motor or in construction of various other types of equipment (e.g., wireline equipment, etc.).

As an example, a cable or other type of component that can be suitable for use in a fluid environment (e.g., a submersible component) can include one or more types of polymers (e.g., one or more types of polymeric materials, etc.). As an example, a polymeric material can include one or more types of polymers. A polymer may be considered to be a relatively large molecule or macromolecule composed of subunits. Polymers are created via polymerization of smaller molecules that can include molecules known as monomers. Polymers may be characterized by physical properties such as, for example, toughness, viscoelasticity, tendency to form glasses and semicrystalline structures, melting temperature, etc.

As an example, a polymeric material can be an electrical insulator. As an example, a polymeric material can be a dielectric material that is an electrical insulator. A dielectric material or dielectric is an electrical insulator that can be polarized by an applied electric field. As an example, a polymeric material can be characterized at least in part by a dielectric constant. For example, KAPTON™ polyimide film (marketed by E. I. Du Pont de Nemours and Company, Wilmington, Delaware) can be characterized by a dielectric constant that can depend on humidity where the dielectric constant increases with respect to increasing relative humidity (RH), for example, from about 3 to about 4 for an increase from about 0 percent RH to about 100 percent RH (e.g., for a 1 mil film of KAPTON® type HN polymer). Such water-related changes in properties are due to polyimide films being formed by condensation reactions. Polyimide, when exposed to water, can degrade via hydrolytic attack. The kinetics of hydrolytic degradation can depend on temperature and pressure as well as, for example, presence of other constituents in an environment.

In Table 1, the insulation may be a polymeric material. As an example, the insulation may be a polymeric material that is or includes polyimide. In such an example, the lead (Pb) layer can be a barrier layer that acts to protect the insulation. For example, the lead (Pb) layer can reduce permeation of water, $H_2S$, $CO_2$ or one or more other constituents that can degrade the insulation and/or otherwise impact its dielectric properties (e.g., ability to insulate a conductor). While lead (Pb) is mentioned as a barrier material, one or more other types of barrier materials may be utilized, which may be, for example, one or more of metallic material, ceramic material, and polymeric material.

As an example, a magnet wire can include insulation and a barrier layer disposed about the insulation where the insulation may be or include polymeric material and where the barrier layer includes barrier material that can reduce permeation of water, $H_2S$, $CO_2$ or one or more other constituents that can degrade the insulation and/or otherwise impact its dielectric properties (e.g., ability to insulate a conductor). As an example, a barrier material can include one or more of metallic material, ceramic material, and polymeric material.

Figure 5:
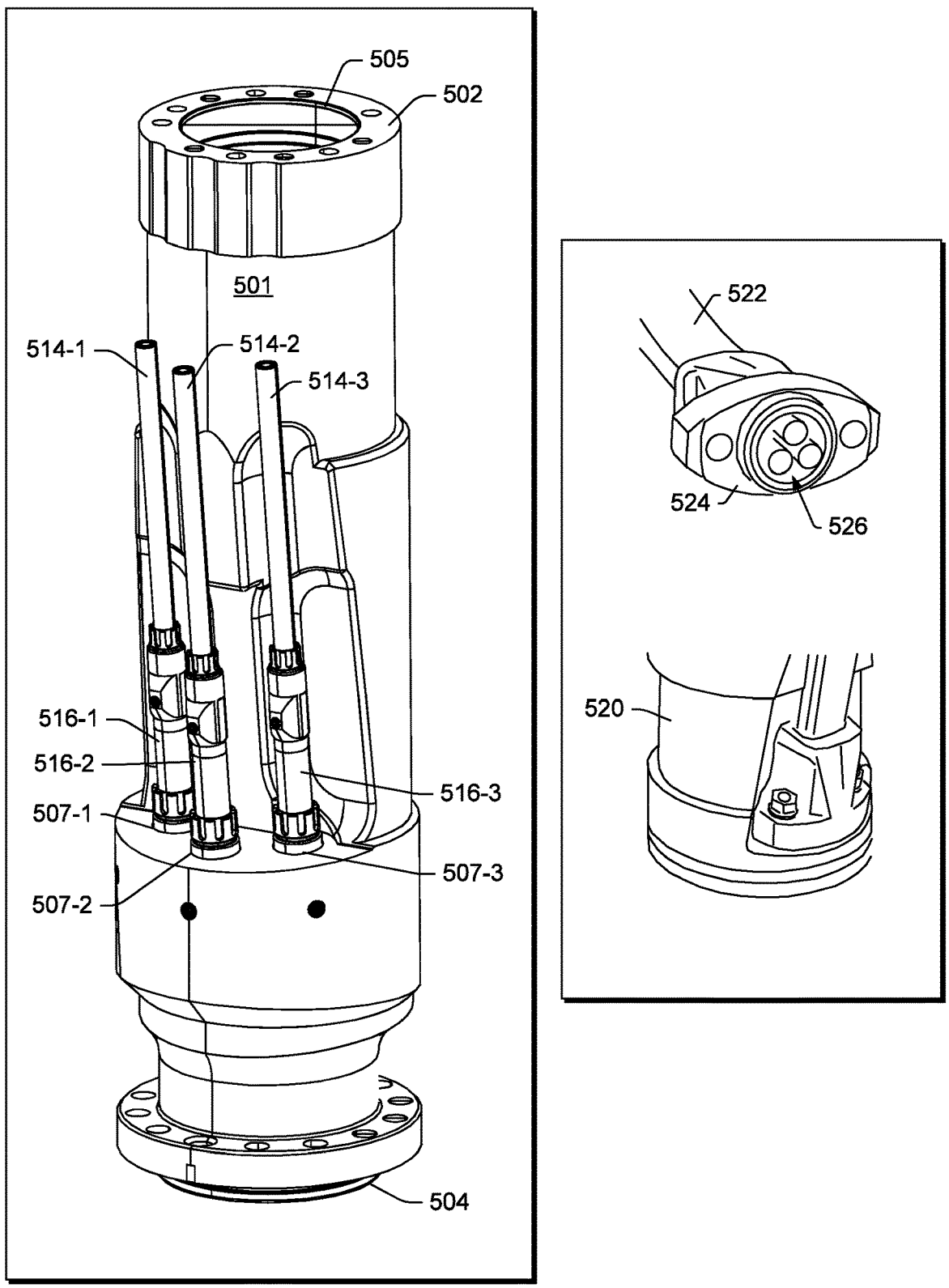
FIG. 5 illustrates examples of equipment.

FIG. 5 shows various examples of motor equipment. A pothead unit 501 includes opposing ends 502 and 504 and a through bore, for example, defined by a bore wall 505. As shown, the ends 502 and 504 may include flanges configured for connection to other units (e.g., a protector unit at the end 502 and a motor unit at the end 504). The pothead unit 501 includes cable passages 507-1, 507-2 and 507-3 (e.g., cable connector sockets) configured for receipt of cable connectors 516-1, 516-2 and 516-3 of respective cables 514-1, 514-2 and 514-3. As an example, the cables 514-1, 514-2 and 514-3 and/or the cable connectors 516-1, 516-2 and 516-3 may include one or more polymeric materials. For example, a cable may include polymeric insulation while a cable connector may include polymeric insulation, a polymeric component (e.g., a bushing), etc. As an example, the cables 514-1, 514-2 and 514-3 may be coupled to a single larger cable. The single larger cable may extend to a connector end for connection to a power source or, for example, equipment intermediate the cable and a power source (e.g., an electrical filter unit, etc.). As an example, a power source may be a VSD unit that provides three-phase power for operation of a motor.

FIG. 5 also shows a pothead unit 520 that includes a socket 521. As an example, a cable 522 may include a plug 524 that can couple to the socket 521 of the pothead unit 520. In such an example, the cable 522 may include one or more conductors 526. As an example, a cable may include at least one fiber optic cable or one or more other types of cables. As an example, a fiber optic cable can include a layer of polymeric material where a barrier layer may be disposed over the layer of polymeric material. In such an example, the barrier layer may help to protect the layer of polymeric material from one or more constituents in an environment. As an example, a fiber optic cable may be suitable for use in a fluid environment where the fiber optic cable is a submersible fiber optic cable.

As explained above, equipment may be placed in a geologic environment where such equipment may be subject to conditions associated with function or functions of the equipment and/or be subject to conditions associated with the geologic environment. Equipment may experience conditions that are persistent (e.g., relatively constant), transient or a combination of both. As an example, to enhance equipment integrity (e.g., reduction in failures, increased performance, longevity, etc.), equipment may include at least one polymeric material and at least one barrier layer disposed about at least one of the at least one polymeric material.

Figure 6:
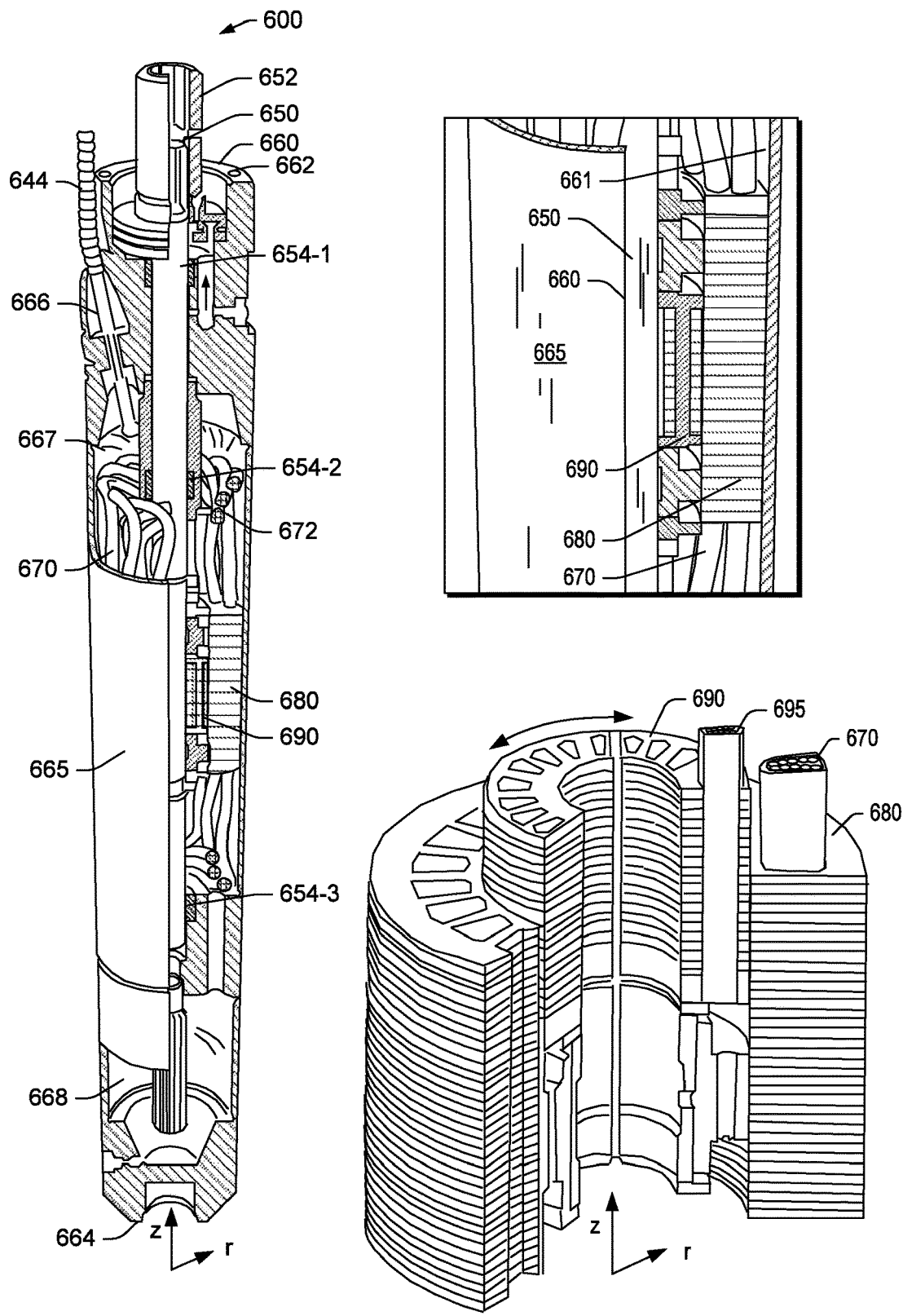
FIG. 6 illustrates examples of equipment.

FIG. 6 shows a perspective cut-away view of an example of a motor assembly 600 that includes a power cable 644 (e.g., MLEs, etc.) to supply energy, a shaft 650, a housing 660 that may be made of multiple components (e.g., multiple units joined to form the housing 660), stacked laminations 680, stator windings 670 of wire (e.g., magnet wire) and rotor laminations 690 and rotor windings 695 coupled to the shaft 650 (e.g., rotatably driven by energizing the stator windings 670).

As shown in FIG. 6, the housing 660 includes an inner surface 661 and an outer surface 665. As an example, the housing 660 can define one or more cavities via its inner surface 661 where one or more of the cavities may be hermetically sealed. As an example, such a cavity may be filled at least partially with dielectric oil. As an example, dielectric oil may be formulated to have a desired viscosity and/or viscoelastic properties, etc.

As shown, the shaft 650 may be fitted with a coupling 652 to couple the shaft to another shaft. A coupling may include, for example, splines that engage splines of one or more shafts. The shaft 650 may be supported by bearings 654-1, 654-2, 654-3, etc. disposed in the housing 660.

As shown, the housing 660 includes opposing axial ends 662 and 664 with the substantially cylindrical outer surface 665 extending therebetween. The outer surface 665 can include one or more sealable openings for passage of oil (e.g., dielectric oil), for example, to lubricate the bearings and to protect various components of the motor assembly 600. As an example, the motor assembly 600 may include one or more sealable cavities. For example, a passage 666 allows for passage of one or more conductors of the cable 644 (e.g., or cables) to a motor cavity 667 of the motor assembly 600 where the motor cavity 667 may be a sealable cavity. As shown, the motor cavity 667 houses the stator windings 670 and the stator laminations 680. As an example, an individual winding may include a plurality of conductors (e.g., magnet wires). For example, a cross-section 672 of an individual winding may reveal a plurality of conductors that are disposed in a matrix (e.g., of material or materials) or otherwise bound together (e.g., by a material or materials). In the example of FIG. 6, the motor housing 660 includes an oil reservoir 668, for example, that may include one or more passages (e.g., a sealable external passage and a passage to the motor cavity 667) for passage of oil.

As an example, a shaft may be reciprocating, for example, where a shaft includes one or more magnets (e.g., permanent magnets) that respond to current that passes through stator windings.

As an example, a polymeric matrix may be formed of organic and/or inorganic monomeric and/or polymeric materials. As an example, one or more of an epoxy, bismaleimide, polybutadiene, benzoxazine, cyanate ester, silicone, Ring-Opening Metathesis Polymers (ROMP), and preceramic polymers may be utilized.

As an example, one or more monomers and/or polymers may be amphiphilic, which may facilitate blending in one or more fillers. As an example, the functionalized linseed oil marketed as DILULIN™ material (Cargill, Inc., Wayzata, Minnesota) is amphiphilic and can allow for increasing content of one or more inorganic fillers of a composite material. Where DILULIN™ material is mentioned, a functionalized linseed oil other than that marketed as DILULIN™ may optionally be utilized.

The PubChem open chemistry database lists the following information for "Dilulin":

PubChem CID: 102162842
Molecular Formula: C621110606
Molecular Weight: 947.50144 g/mol
InChI Key: CFMHDZMTXRKWMC-PUJZDUKBSA-N
Dilulin has an IUPAC name as follows: "[3-[(Z)-octadec-9-enoyl]oxy-2-[8-[3-[(2Z,5Z)-octa-2,5-dienyl]-2-bicyclo [2.2.1]hept-5-enyl]octanoyloxy]propyl] (Z)-octadec-9-enoate". As to linseed oil, which is a triglyceride, it includes a triester (triglyceride) derived of linoleic acid, alpha-linolenic acid, and oleic acid. As an example, Dilulin or DILULIN™ material may be a modified linseed oil.

As an example, a polymeric material can be thermally conductive and electrically insulative and be utilized to encapsulate windings of an electric motor. Such an approach may provide for lower winding temperatures and end coil temperatures through heat dissipation.

An electric motor may include a coil retention system such as, for example, a full winding encapsulation type, a varnished windings type, or an end coil retention type (e.g., one that does not support wires in slots). As an example, a glass-fiber tape can be included in a coil retention system where, for example, the glass-fiber tape is wrapped around end turns and where the glass-fiber tape is impregnated with a crosslinking resin.

As an example, an encapsulation technique can depend on the type of coil retention system employed. For example, the use of a thermosetting polymer can depend on the type of coil retention system. An encapsulated system can involve use of one or more materials and one or more particular processes. As an example, varnished windings approach can include use of a solvent-based polybutadiene system, which tends to be more elastomeric than structural. An end coil retention resin can be a silica-filled epoxy, which has suitable structural properties due in part to the fact that the end coil retention provides coil stabilization while holding the end turns and while not supporting wires in the slots.

As an example, to maintain mechanical robustness of magnet wire wrapped in a stator of an electric motor, insulated motor windings may use a coil retention system where at least ends of coils are held in place by a structural composite that includes fibrous reinforcement (e.g., one or more of glass, quartz, aramid, etc.) and an organic and/or inorganic polymer matrix.

As to dielectric fluids (e.g., motor oils, etc.), consider as examples one or more of purified mineral oils, polyalphaolefin (PAO) synthetic oils, PFPE (polyperfluoroether), etc. Such dielectric fluids can be relatively resistance to well fluid(s), which can thereby allow an electric motor to function in case of leakage well fluid.

Figure 7:
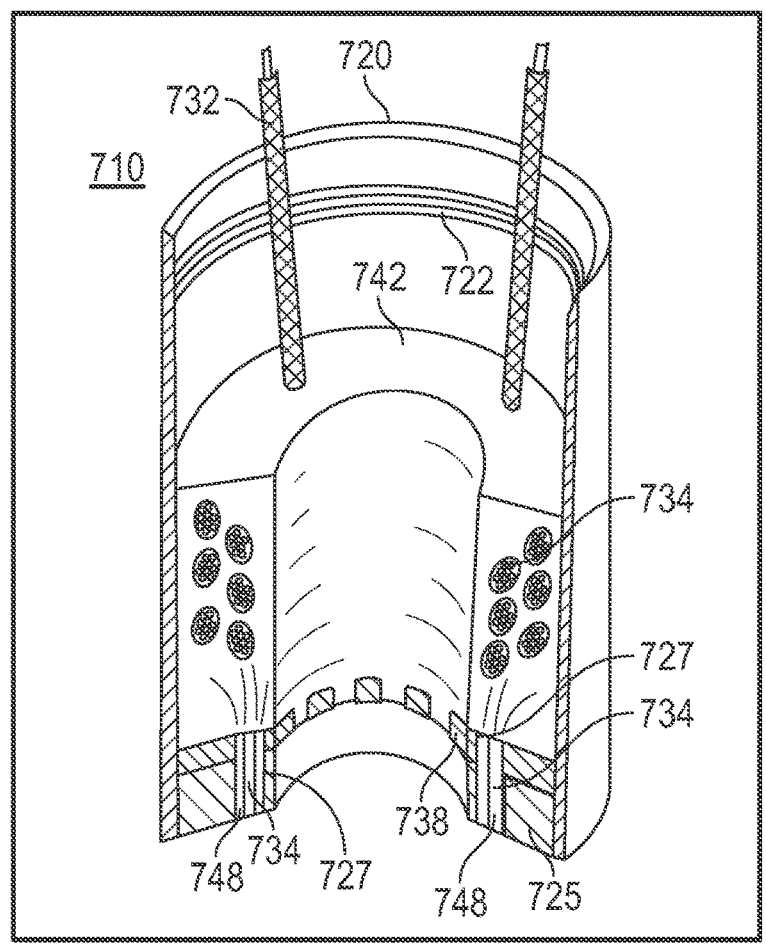
FIG. 7 illustrates examples of equipment.
Figure 7:
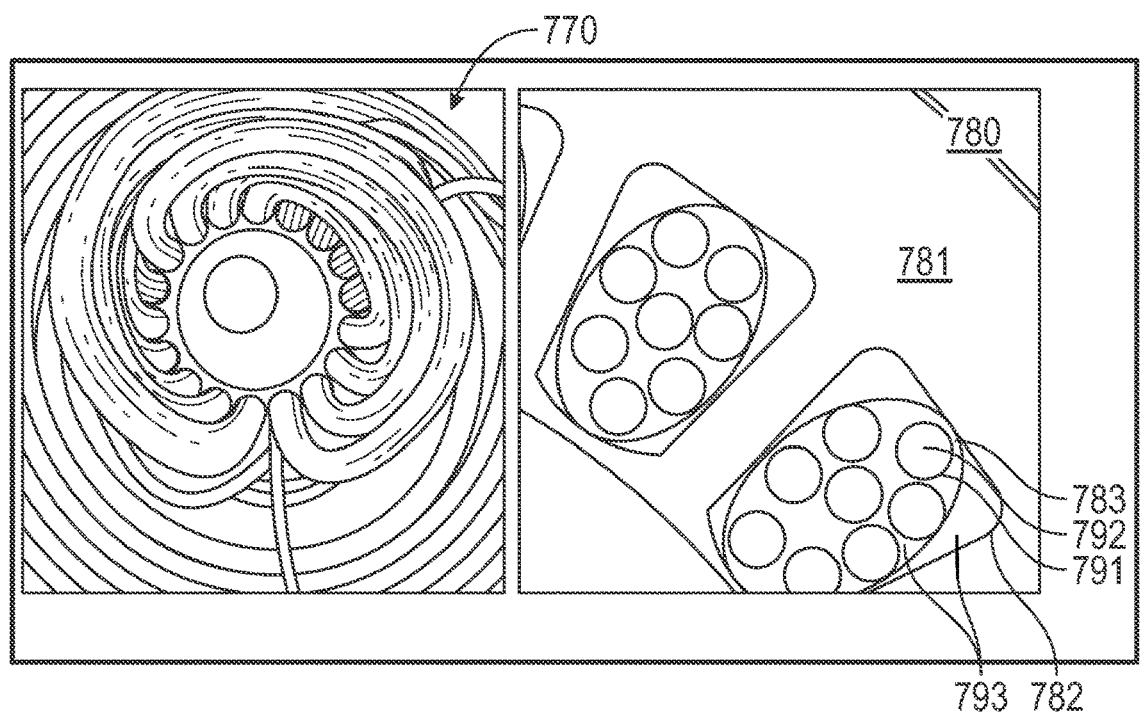

FIG. 7 shows an example of an electric motor 710, an example of a photograph of a portion of an electric motor 770 and a photograph 780 of a portion of an electric motor.

As shown in FIG. 7, the electric motor 710 includes a housing 720 with threads 722. Lead wires (e.g., brush wires) 732 are shown where a number of such wires can correspond to a number of phases. For example, for a three phase electric motor, there can be three lead wires 732 (e.g., two being shown in the cutaway view). The lead wires 732 can be associated with a top or uphole end of an electric motor; whereas, at a bottom or downhole end, a wye point may exist where phases are electrically coupled. As an example, a wye point may be electrically coupled to one or more other components such as, for example, a gauge (e.g., a sensor unit, etc.).

As shown in the example of FIG. 7, the lead wires 732 are electrically coupled to phase windings or phase coils where ends of the windings or coils 734 can extend downward through slots 727 in laminations 725. As shown in the example of FIG. 7, a polymeric material 742, which may optionally be a polymeric composite material (e.g., polymeric material that includes one or more fillers) contacts the ends of the windings or coils 734 and a portion of the polymeric material 742 extends downwardly through the slots 727 in the laminations 725.

In the example of FIG. 7, a molding insert may be utilized to contain the polymeric material 742 (e.g. encapsulant material) during curing of the polymeric material (e.g., where reactions occur involving at least in part monomers, etc.).

As an example, a method can include an injection process for injecting the polymeric material 742 into a cavity of the housing 720 to contact ends of windings or coils (e.g., of magnet wire), a molding process for molding the polymeric material 742 about the ends of the windings or coils in a manner to not interfere with other components of an electric motor (e.g., to create a shaft space and/or rotor space, etc.), an assembly process for assembling an electric motor 710 that includes the stator disposed in the housing 720 and an assembly process for assembly of a downhole tool that can utilize the electric motor 710 (e.g., an ESP, etc.).

As an example, an electric motor of an ESP may have a substantially cylindrical shape with a diameter of about 18 cm and an axial length of about 10 m. In such an example, a volume of encapsulant may be of the order of tens of liters.

As an example, for an electric motor of another type of downhole tool, a volume may be in a range where a lower limit of the range is of the order of milliliters. As an example, a downhole tool may be a wireline tool. As an example, a downhole tool may be a completions tool. As an example, a downhole tool can include an electric motor that has a substantially cylindrical shape. In such an example, consider, as an example, a total volume of about 350 milliliters, a length of about 12 cm and a diameter of about 5 cm. Of the total volume, a fraction thereof can be encapsulant (e.g., an encapsulant volume of the order of tens of milliliters).

In the example of FIG. 7, the photograph 770 shows a portion of an electric motor where resin is applied to glass fabric for the lower portion of the windings shown in the photograph 770 (e.g., upper portion shows the glass fabric without the resin). As an example, windings can be held in place by a polymeric material (e.g., optionally a polymeric composite material) that completely encapsulates end turns and that fills slots. In such an example, air voids may be substantially removed through use of vacuum impregnation and degassing while prepolymer is heated to a low viscosity prior to gelation.

Thermally conductive encapsulants can improve reliability of ESP systems by decreasing motor winding temperatures. Applications can include SAGD, subsea, geothermal, etc. Such materials may be suitable for use in equipment for drilling and measurement operations (e.g., D&M).

In the example of FIG. 7, the photograph 780 of an example of a portion of a product (e.g., a portion of an example of a stator). In particular, the photograph 780 shows a lamination 781 that includes a slot 782 where slot liner material 783 defines an interior space such that the slot liner material 783 surrounds magnet wire 792 that includes insulation 791. As shown in the photograph 780, polymeric material 793, which may be polymeric composite material, is disposed exteriorly and interiorly with respect to the slot liner material 783. As an example, the insulation 791 can be of the order of about 0.1 mm to about 0.3 mm. As an example, the slot liner material 783 can be a polymeric film that may be of one or more layers where a layer of the film may be of the order of about 0.1 mm to about 0.3 mm. As shown, the polymeric material 793 can at least partially fill spaces defined by the slot 782 of the lamination 781. As an example, an individual plate may be formed of carbon steel with an oxide coating where a plurality of such plates can be stacked to form the laminations.

As an example, heat energy generated during operation of an electric motor that includes the stator of the photograph 780 may be transferred to the polymeric material 793. For example, current in the magnet wire 792 can generate heat due at least in part to resistance of the magnet wire 792. As the polymeric material 793 is in contact with the magnet wire 792 (e.g., via the electrical insulation 791) it can conduct at least a portion of the heat energy away from the magnet wire 792, noting that resistance of the magnet wire 792 may depend on temperature (e.g., consider a wire where resistance increases with temperature or, in other words, where the wire becomes less efficient as temperature increases).

As an example, insulation may include one layer or multiple layers of a high temperature polymeric dielectric material. As an example, polymeric insulating material may be in the form of tape that may be applied helically or longitudinally (e.g., by wrapping polyimide tape onto a conductor in an overlap configuration). As an example, a polymeric insulating material may be extruded.

As mentioned, water can degrade various types of polymeric materials. For example, water phases at high temperatures (e.g. SAGD) and pressures can rapidly degrade polyimides and thereby reduce mean time between failures (MTBF) of equipment. Environments that include $H_2S$ and water can degrade materials. For example, sour high-pressure conditions where $H_2S$ and water are present, polymer insulation degradation may occur at a relatively rapid rate.

As an example, one or more methods can be utilized to manufacture insulated conductors that exhibit resistance to water, steam, gas, etc., which may thereby impart reliability and/or usability in particular environments.

As an example, a polymeric material can be a polyaryletherketone (PAEK) family polymer-based material such as, for example, polyetheretherketone (PEEK).

As an example, a polymeric material can be a fluoropolymer-based material. As an example, consider one or more fluoroelastomers such as, for example, fluoroelastomers abbreviated as FKMs. FKM (FPM by ISO) is a designation for about 80 percent of fluoroelastomers as defined in ASTM D1418. FKMs may exhibit heat and fluid resistance. For example, in FKMs, bonds between carbon atoms of the polymer backbone and attached (pendant) fluorine atoms tend to be resistant to chain scission and relatively high fluorine-to-hydrogen ratios can provide stability (e.g., reduced risk of reactions or environmental breakdown). Further, FKMs tend to include a carbon backbone that is saturated (e.g., lacking covalent double bonds, which may be attack sites). Elastomers such as one or more of the VITON™ class of FKM elastomers (E. I. du Pont de Nemours & Co., Wilmington, Delaware) may be used (e.g., VITON™ A, VITON™ B, VITON™ F, VITON™ GF, VITON™ GLT, VITON™ GFLT, etc.).

As an example, a polymeric material may be a thermoplastic material. For example, consider a poly-aryl ether ketone (e.g., PEK, PEEK, PEKEKK, etc.), a melt extrudable fluoropolymer (e.g., ethylene tetrafluoroethylene (ETFE), polyvinylidene fluoride (PVDF), fluorinated ethylene propylene (FEP), perfluoroalkoxy (PFA), epitaxial co-crystaline alloy (ECA) fluoroplastic, etc.), or other suitable material. As an example, polyether ether ketone (PEEK) may be utilized as a polymeric material. As an example, polytetrafluoroethylene (PTFE) may be utilized as a polymeric material.

As an example, a composition may be or include a commercially available DuPont™ ECCtreme® ECA 3000 fluoroplastic resin (DuPont Chemicals and Fluoroproducts, Wilmington Delaware). As an example, such a resin may be a perfluoropolymer mixture (PFP) that may be heat aged to become an ECC PFP. As an example, a polymeric material can include epitaxial co-crystals of perfluoroalkoxy (PFA) and polytetrafluoroethylene (PTFE). As an example, perfluoroalkoxy (PFA) can be a polymer of tetrafluoroethylene and perfluorovinylether.

As an example, a polymeric material may be classified based on temperature. For example, a low-temperature class may include materials such as polypropylene (PP), co-polymers of PP and polyethylene (PE), ETFE, PVDF, etc.; and, for example, a mid-temperature class may include materials such as FEP, PFA, etc. As an example, a high-temperature class may include materials that can withstand temperatures greater than approximately 260 degrees C. (e.g., approximately 500 degrees F.). As an example, PEEK and ECA may function as insulators at temperatures in excess of approximately 260 degrees C. (e.g., approximately 500 degrees F.).

As an example, a material can be a PEEK/fluoropolymer composite material. Such a material may be suitable for high temperature downhole applications.

For high temperature and pressure applications in harsh environment as in downhole oil industry, PEEK finds use as an insulation material, such as in high temperature cables and motor lead extensions (MLEs). As an example, a PEEK-based cable may be rated for temperatures up to about 260 degrees C. in the presence of corrosive fluids and gases, such as hydrogen sulfide ($H_2S$) and carbon dioxide ($CO_2$).

The crystalline structure of PEEK can be developed at temperatures above the glass transition temperature (Tg) and below the melting point. The crystallinity of PEEK may increase during service time in a manner that depends on one or more conditions (e.g., temperature, etc.). As an example, an increase in crystallinity of PEEK during operation may lead to an increase in stiffness and a decrease in toughness. Cracks may form in PEEK insulation material after some amount of operation time, for example, under mechanical stress.

Under hot/wet conditions, PEEK can adsorb some amount of humidity, which can negatively impact dielectric strength, which may allow for arc tracking and consequently high electrical test failure rates in a manufacturing process. Therefore, a process may aim to develop the structure of PEEK material to make it tougher and more water resistant under expected operational conditions.

As an example, a material can be formed by blending PEEK with one or more selected fluoropolymers. For example, consider one or more of polytetrafluoroethylene (PTFE) and perfluoroalkoxy copolymer (PFA).

As an example, one or more fillers may be electrically insulative (e.g., relatively non-conductive). As an example, consider silica, which is a group IV metal oxide, which has good abrasion resistance, electrical insulation and high thermal stability. It is insoluble in acid with the exception of hydrogen fluoride (HF). As an example, a filler may be or include ceramic grade sand, which may be less than about 75 microns in particle size with a silica content above about 97.5 percent where additional material may include less than about 0.55 percent alumina ($Al_2O_3$) and less than about 0.2 ferric oxide ($Fe_2O_3$). As an example, one or more fillers may include silica and/or alumina and/or one or more other materials.

As an example, thermal conductivity of a PEEK/PTFE blend and/or a PEEK/PFA blend may be enhanced via addition of one or more types of thermally conductive ceramic fillers. For example, consider one or more of silica, alumina and boron nitride.

As an example, inclusion of PFA and PTFE may improve toughness and water resistance of PEEK, while a ceramic filler or fillers can improve thermal conductivity, which can offer opportunities to decrease operational temperatures (e.g., via improved heat transfer), which, in turn, may help to prevent overheating (e.g., or reduce time-temperature area experienced during operation).

As an example, consider an MLE or MLEs that are utilized in an operation where space constraints may exist in a downhole environment. In such an example, reducing ampacity of a cable can be desirable as it can help to increase current carrying capacity for a given geometry.

As an example, a composite material that includes PEEK, fluoropolymer and thermally conductive filler may be utilized in one or more pieces of equipment such as, for example, cables, MLEs, magnet wires, and slot liners.

As mentioned, various materials can experience issues during operation at high temperature and pressure in a wet environment. For example, a high temperature above Tg and below the melting point can induce crystallization of PEEK. Increasing the percentage of crystallinity of PEEK during service time at high temperature can have a negative impact on the mechanical properties and performance of PEEK insulation materials. Stiffness can also increase and consequently such material can become more brittle (e.g., more readily generate cracks under mechanical stress). Where such phenomena occur, failure rate may be expected to increase.

Further, as mentioned, PEEK can adsorb humidity when utilized at high temperature in a wet environment. Adsorbed humidity can reduce the breakdown voltage, increase dielectric constant, and may allow for arc tracking that may result in electrical failure.

As an example, a composite material can include PEEK, another polymeric material and optionally one or more fillers where the crystallization behavior of PEEK may be mediated and/or PEEK may be improved as to its toughness under operation at high temperature. As an example, such a composite material may include or may be shielded by one or more materials that can counter the effects of humidity.

As an example, a method can include mixing PEEK with PFA or PTFE flouropolymers to produce a compatible blend with improved mechanical properties as well as water resistance. PFA and PTFE tend to be high performance flouropolymers with high dielectric strength, low dissipation factor, chemical inertness, high hydrophobicity, and corrosion resistance. Favorable interaction between PEEK and PFA or PTFE can help to inhibit the crystallization process of PEEK at high temperature, for example, as may be experienced during service time of a component that includes such a blend.

As an example, PFA and/or PTFE can impart elasticity to PEEK and, for example, increase toughness.

As an example, PEEK may be a graded PEEK. For example, consider a medium viscosity grade PEEK. As an example, PEEK 381 may be utilized (see, e.g., VICTREX™ PEEK 381G, etc.). As an example, PEEK can have a melting point of about 340 degrees C. (e.g., about 343 degrees C.). As an example, PEEK can have a glass transition temperature (Tg) of about 140 degrees C. (e.g., about 143 degrees C.). As an example, PEEK may have a thermal conductivity of about 0.3 W/m-k. As an example, PEEK may have a melt viscosity of about 300 Pa·s at a temperature of about 400 degrees C. As an example, PEEK may have a dielectric constant of about 3 (e.g., about 3.2 at about 23 degrees C. and about 50 Hz).

As an example, PFA may be a graded PFA. For example, consider a medium viscosity grade PFA. As an example, PFA 345 may be utilized (see, e.g., TEFLON™ PFA 345, etc.). As an example, PFA can have a melting point of about 300 degrees C. (e.g., about 305 degrees C.). As an example, PFA may have a thermal conductivity of about 0.2 W/m-k. As an example, PFA may have a dielectric constant of about 2 (e.g., about 2.1 short term about 60 Hz to about 1 GHz).

As to dielectric constant, per the theory of permittivity, in a frequency domain, the complex relative permittivity $\varepsilon^*$ of a material to that of free space may be expressed as $\varepsilon^* = \varepsilon' - j\varepsilon''$ where the real part $\varepsilon'$ is referred to as the dielectric constant and represents stored energy when the material is exposed to an electric field while the dielectric loss factor $\varepsilon''$ is the imaginary part, which influences energy absorption and attenuation and where $j=(-1)^{0.5}$. Another parameter in electro-magnetic theory is the tangent of loss angle, tan δ, which is equal to the ratio of the dielectric loss factor to the dielectric constant. As an example, air can have a dielectric constant of about 1 at a given frequency and temperature and can have an electrical conductivity of about 0 while distilled/deionized water can have a dielectric constant of about 80 (e.g., 27 MHz to about 915 MHz) and an electrical conductivity of about 0.01 S/m; whereas, 0.05 percent salt water can have an electrical conductivity of about 3.25 S/m, which increases to about 173 S/m at a salt concentration of about 1 percent.

In dielectric materials, the electric field strength decreases with distance z from the surface and may be estimated as follows: $E=E_0 e^{-\alpha z}$ where $\alpha$ is an attenuation factor that depends on the dielectric properties of the material, which can depend on the free-space wavelength, $\lambda_0$. The temperature of a material has an effect on dielectric properties. For example, in some types of materials (e.g., fluids, etc.) loss factor can increase with increasing temperature at low frequencies due to ionic conductance and can decrease with increasing temperature at high frequencies due to free water dispersion.

As an example, a material may be semi-conductive or a semiconductor. As an example, a semiconductor can be a solid substance that exhibits conductivity between that of an insulator and that of an electrically conductive metal, for example, due to addition of an impurity, impurities or particles and/or due to one or more types of temperature effects.

As an example, a thermoplastic blend of PEEK/PFA may include a filler or fillers that can provide semi-conductive character. As an example, a thermoplastic blend of PEEK/PFA may include a filler or fillers that can be thermally conductive. As an example, a thermoplastic blend of PEEK/PFA may include a filler or fillers that can be thermally conductive and optionally provide one or more other types of character. As an example, a filler or fillers may be electrically insulative and optionally provide one or more other desirable properties (e.g., electrically insulative and thermally conductive).

As an example, a thermally conductive composite material may be prepared by mixing a blend of PEEK/PFA, a blend of PEEK/PTFE or a blend of PEEK/PFA/PTFE with an amount of thermally conductive filler or fillers (e.g. silica, alumina, boron nitride, or mixture of them). As an example, a thermally conductive fillers can help to reduce risk and/or time profile of overheating and may, for example, help to decrease the operation temperature.

As an example, a thermally conductive composite of PEEK/PFA/ceramic, PEEK/PTFE/ceramic, or PEEK/PFA/PTFE/ceramic can be tailored for a particular application or applications (e.g., ESP cables, MLEs, magnet wires, and slot liner). Such an approach may aim to retain properties of PEEK while mediating drawbacks as may be associated with post crystallization, increase stiffness, decrease toughness during operation at high temperature, etc.

As an example, a polymeric composite material can be obtained through use of a polymer matrix filled with one or more types of particulate fillers. As an example, particulate filler may be or include aluminum oxide, aluminum nitride, boron nitride, silicon nitride and/or beryllium oxide.

Examples of some types of fillers and properties are presented in Table 2, below.

TABLE 2

| Examples of thermally conductive/electrically insulative fillers. | | | | | |
|---|---|---|---|---|---|
| Properties | BN | AlN | $Al_2O_3$ | $SiO_2$ | ZnO |
| Thermal Conductivity (W/m-K) | 300+ | 260 | 30 | 1.4 | 54 |
| Specific Heat (J/kg-K) @ 25 C. | 794 | 734 | 798 | 689 | 523 |
| Density | 2.25 | 3.26 | 3.98 | 2.20 | 5.64 |

In Table 2, the example fillers tend to have relatively high levels of thermal conductivity while still having relatively high dielectric strengths.

As to shapes of fillers, alumina may be relatively spherical with a relatively low surface area while boron nitride may be plate-like; though boron nitride may be provided in a more spherical shape as an agglomerate (e.g., a spherical agglomerate). As an example, silica may be of a more irregular shape than alumina. As an example, alumina may be of a particle size or sizes (e.g., 80 percent of particles or mean particle size D50) that are in a range from about one micron to about 200 microns. As an example, surface area of alumina may be less than about 0.9 $m^2$ per gram. As an example, boron nitride may be particulate with a particle size or sizes (e.g., 80 percent of particles or mean particle size D50) that are in a range from about 1 micron to about 500 microns. Such particles may include boron nitride crystals sized from about 1 micron to about 30 microns. As an example, boron nitride particles may of a surface area less than about 100 m² per gram. As an example, boron nitride particles may be of a dielectric constant of about 2 to about 5. As an example, boron nitride particles may be of a thermal conductivity of about 10 to 300 or more (W/m-K).

As an example, a polymeric composite material can include alumina and boron nitride and may be relatively free of silica (e.g., less than about 1 percent of silica, less than about 0.5 percent silica, less than about 0.1 percent silica). As an example, a polymeric composite material can include a filler that is plate-like in shape and a filler that is substantially spherical in shape where the two fillers may be dispersed in a polymeric matrix. In such an example, a ratio of the two fillers may be adjusted. As an example, flow dynamics and/or properties of a polymeric composite material may be tailored by use of differently shaped particles (e.g., of one or more fillers) and/or differently sized particles (e.g., of one or more fillers).

As an example, alumina may be present in a polymeric composite material at a volume percent up to about 65 percent of total volume of the polymeric composite material. As an example, boron nitride may be present in a polymeric composite material at a volume percent up to about 65 percent of total volume of the polymeric composite material. As an example, alumina and boron nitride may be present in a polymeric composite material at a volume percent up to about 65 percent of total volume of the polymeric composite material.

As an example, boron nitride may be present in a polymeric composite material at a volume percent up to about 40 percent of total volume of the polymeric composite material. In such an example, the polymeric composite material may also include alumina. As an example, where boron nitride is present in a polymeric composite material, it may be present at a volume percent of about 0.5 percent or more of total volume of the polymeric composite material (e.g., in a range from about 0.5 percent to about 40 percent).

Figure 8:
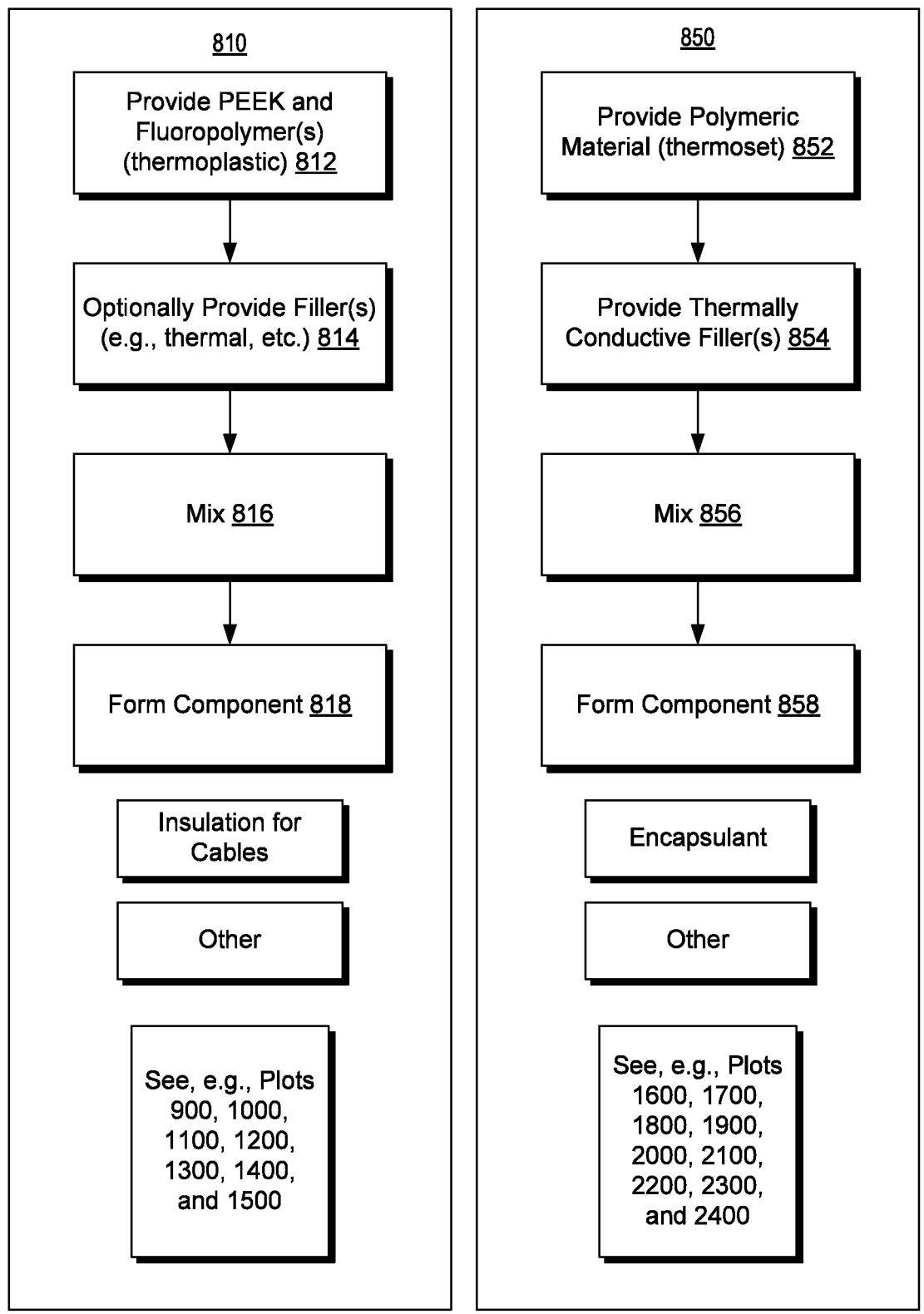
FIG. 8 illustrates an example of an insulated conductor.

FIG. 8 shows an example method 810 and an example method 850. As shown, the method 810 includes a provision block 812 for providing PEEK and one or more fluoropolymers, an optionally provision block 814 for providing one or more fillers, a mix block 816 for mixing provided materials and a formation block 818 for forming a component based at least in part on the mixtures of provided materials.

As shown, the method 850 includes a provision block 852 for providing polymeric material, a provision block 854 for providing one or more fillers, a mix block 856 for mixing provided materials and a formation block 858 for forming a component based at least in part on the mixtures of provided materials.

As shown, the method 810 can include providing thermoplastic material(s) and the method 850 can include providing thermoset material(s). As an example, a component formed by the method 810 may be an insulation material, for example, suitable to insulate a conductor or conductors. As an example, a component formed by the method 850 may be an encapsulant such as, for example, an encapsulant for a submersible electrical unit (e.g., a submersible electric motor).

Various example plots are shown in FIGS. 9 to 15 that can correspond to a method such as the method 810 of FIG. 8 and various example plots are shown in FIGS. 16 to 24 that can correspond to a method such as the method 850 of FIG. 8.

Figure 9:
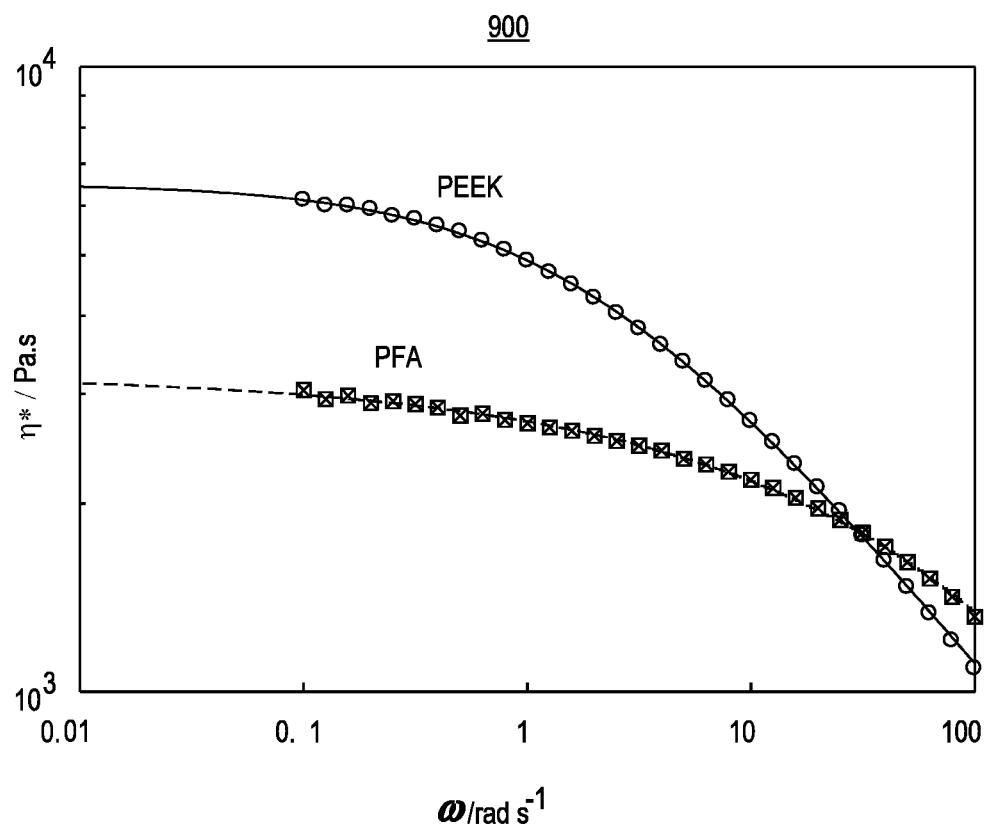
FIG. 9 illustrates examples of methods.

FIG. 9 shows an example of a plot 900 that includes data as to angular frequency dependence of complex viscosity for PEEK and PFA at about 370 degrees C.

As an example, PEEK and PFA with one or more ceramic fillers may be mixed and melt extruded at high temperature and shear rate. In such an example, viscosity of one or more components, particularly the thermoplastic ones (PEEK and PFA) at the processing temperature (e.g. about 370 degrees C.), can be relevant to processing.

As seen in the plot 900 of FIG. 9, data for angular frequency dependence of complex viscosity for PEEK and PFA at about 370 degrees C. indicated presence of a linear viscoelastic regime. In the plot 900, markers indicate data while lines are calculated from a Cross Model:

$$\eta^* = \frac{\eta_0}{1 + (\omega/\omega_c)^\beta}$$

where $\eta_0$ is zero shear viscosity, $\omega_c$ is critical shear frequency and $\beta$ is a material constant.

In the plot 900, both components exhibit Newtonian behavior and shear thinning at low and high angular frequency, respectively. The viscosity of PEEK is higher than that of PFA at lower angular frequency and both of them are about the same at about 30 rad/s. Based on such information, a process can provide for compatibility via blending PEEK and PFA at about 370 degrees C. under shear force, particularly when the viscosity ratio is about one.

Figure 10:
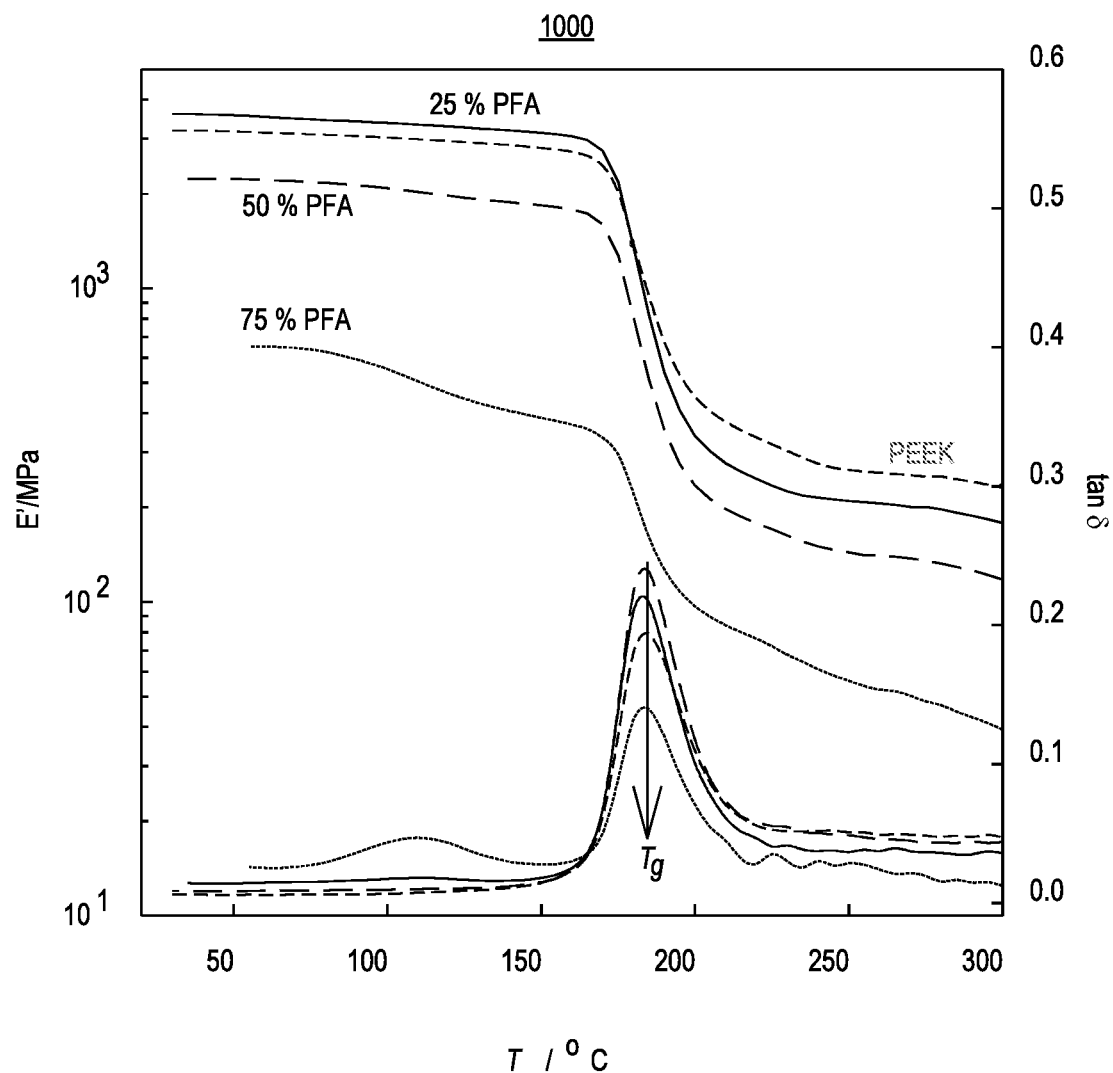
FIG. 10 illustrates an example of a plot of data.

FIG. 10 shows an example plot 1000 of data for temperature dependence of storage modulus and tan $\delta$ for PEEK/PFA blends.

In FIG. 10, the temperature dependence of storage modulus and tan $\delta$ for different PEEK/PFA blends is provided based on DMA data. The data indicate one glass relaxation process for blends with PFA content at about 50 percent by weight or more, which is an indication of suitable compatibility. Further, two relaxation processes can be observed for a PEEK/PFA 25/75 blend (e.g., macroscopic phase separation). Yet further, it can be observed that the storage modulus of the PEEK/PFA 75/25 blend is higher than the pure components at low temperature range. The phase separated blends (PEEK/PFA 25/75) tend to relatively low storage modulus. Based on the data in FIG. 10, the PEEK/PFA 75/25 blend may be suitable for use as a polymeric material and/or as a polymeric matrix, optionally as a polymeric matrix for a composite material. For example, as a composite material, one or more fillers may be included and dispersed within the polymeric matrix. As an example, a filler or fillers may provide semi-conductive character and/or improve thermal conductivity.

Figure 11:
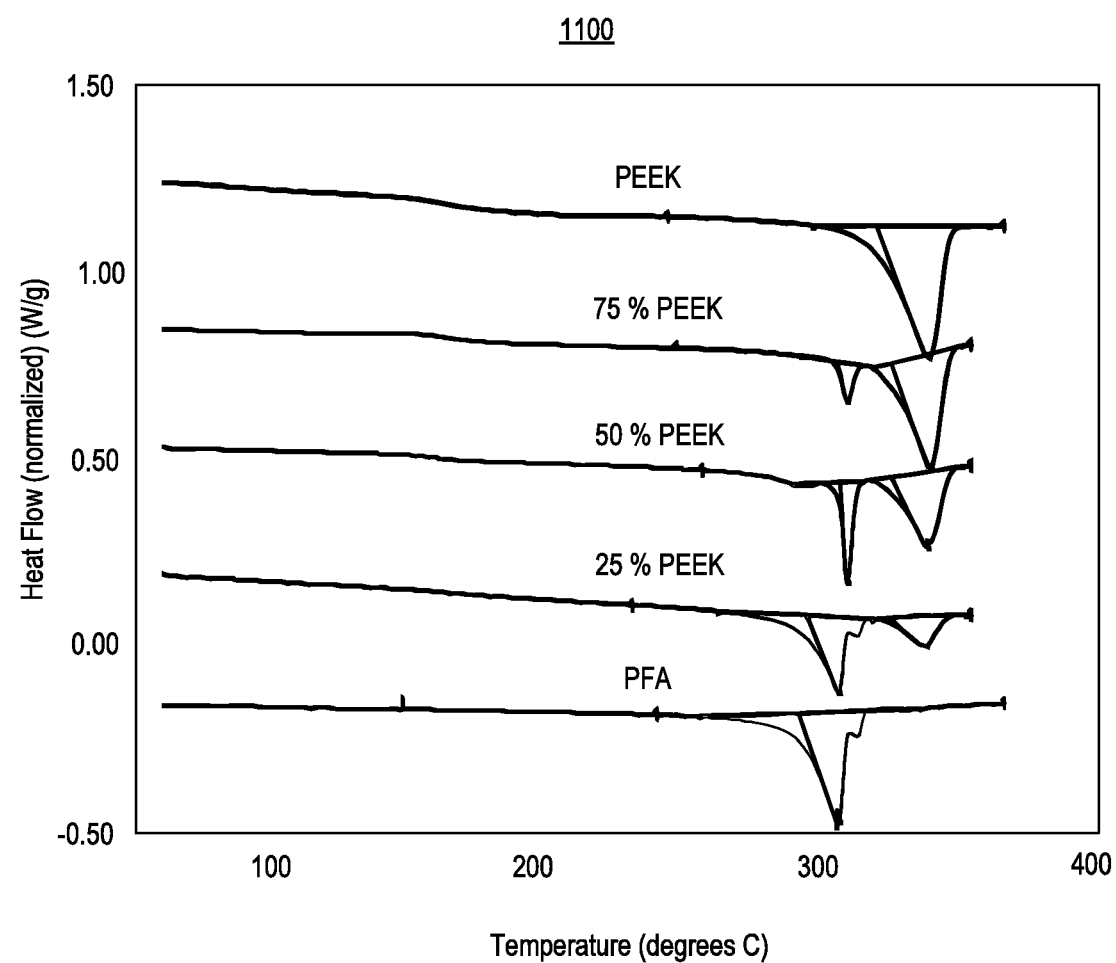
FIG. 11 illustrates an example of a plot of data.
Figure 12:
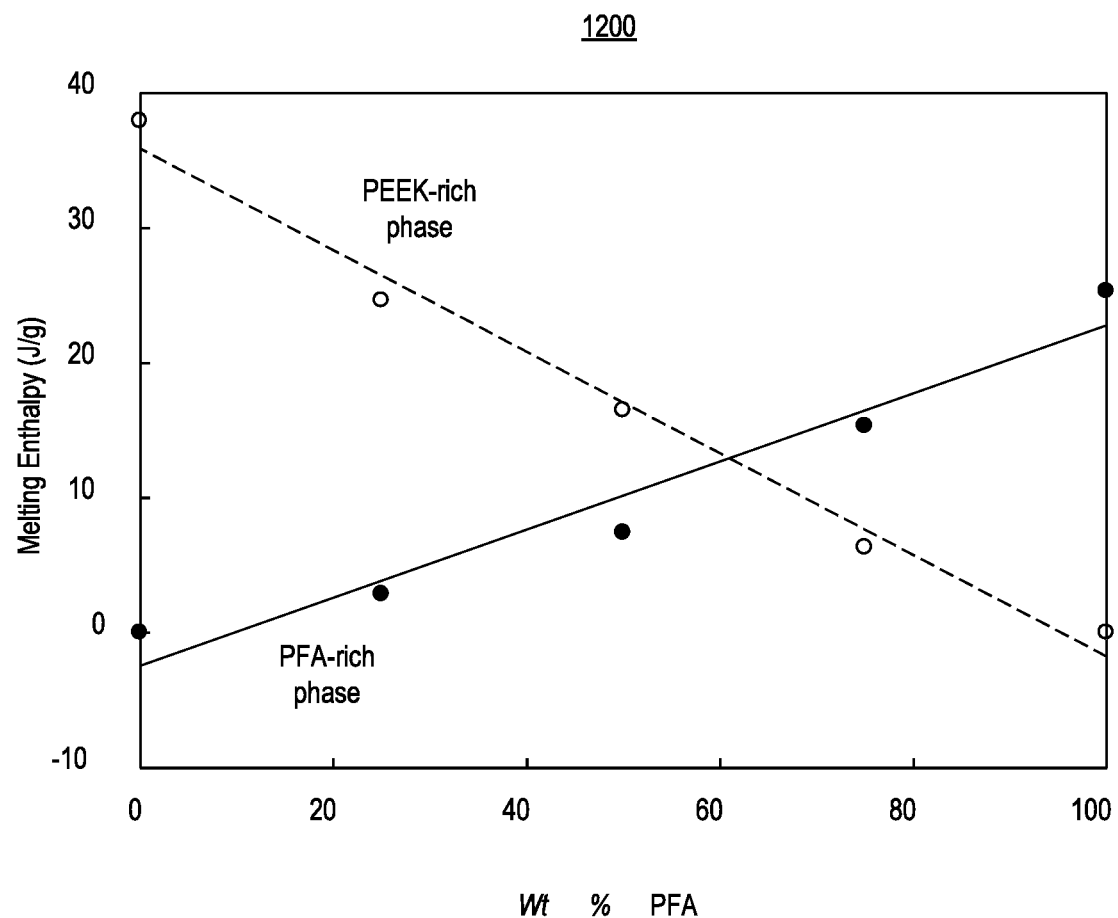
FIG. 12 illustrates an example of a plot of data.

FIGS. 11 and 12 show plots 1100 and 1200, respectively. The plot 1100 shows DSC thermograms for PEEK/PFA blends and the plot 1200 shows melting enthalpies of PEEK-rich and PFA-rich phases of the PEEK/PFA blends.

The melting behavior of both PEEK and PFA were also developed considerably by blending. The melting peak of PFA is lower than that of PEEK and systematically shifted to higher temperature with increasing the concentration of PEEK (see the plot 1100 of FIG. 11). However, the melting temperature of PEEK does not change by blending. Thus, two rich phases exist where the percentage of PEEK dissolved in the PFA-rich phase is higher than the percentage of PFA dissolved in the PEEK-rich phase. The melting enthalpy calculated from the endothermic melting peaks of PEEK-rich and PFA-rich phases were linearly changed with composition as seen in the plot 1200 of FIG. 12. The data of the plots 1100 and 1200 indicates suitable compatibility of the various PEEK/PFA blends.

Figure 13:
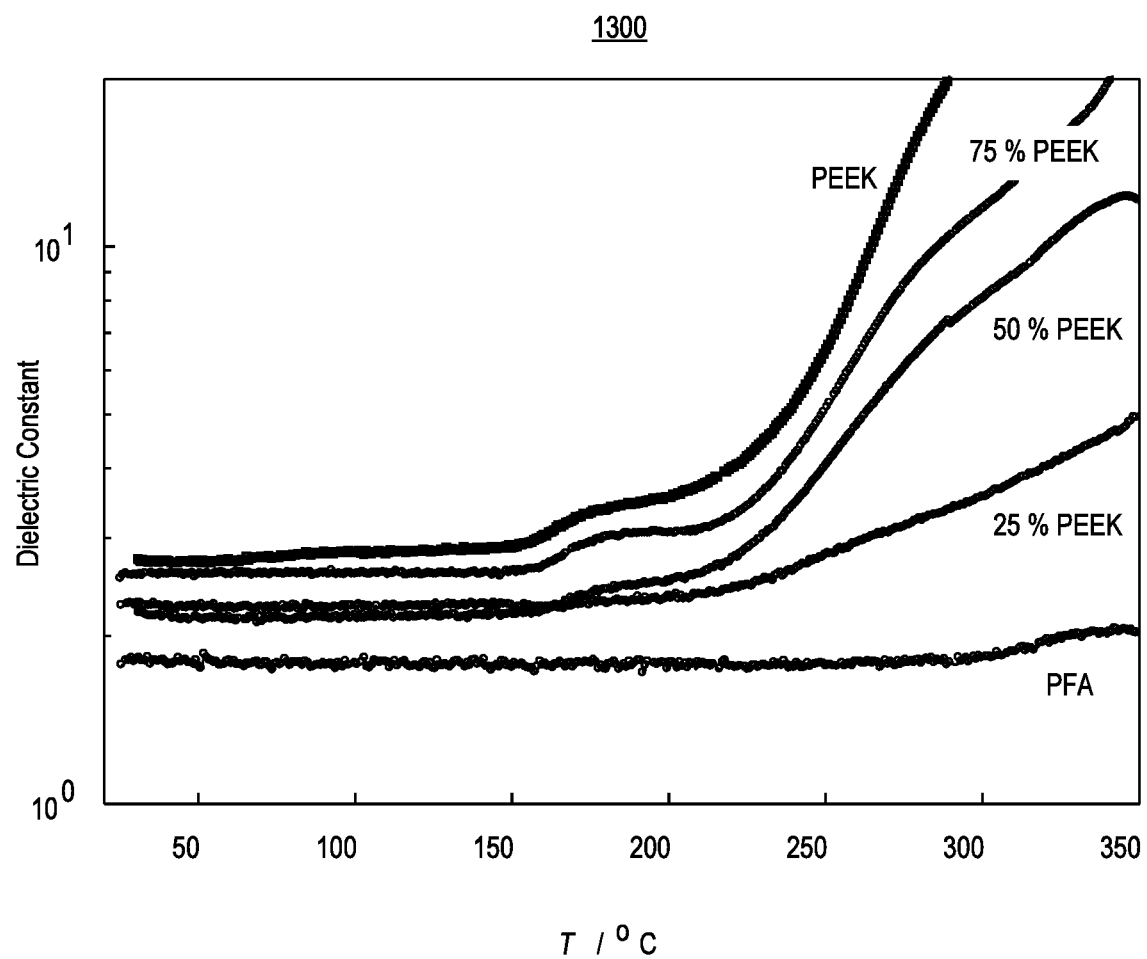
FIG. 13 illustrates an example of a plot of data.
Figure 14:
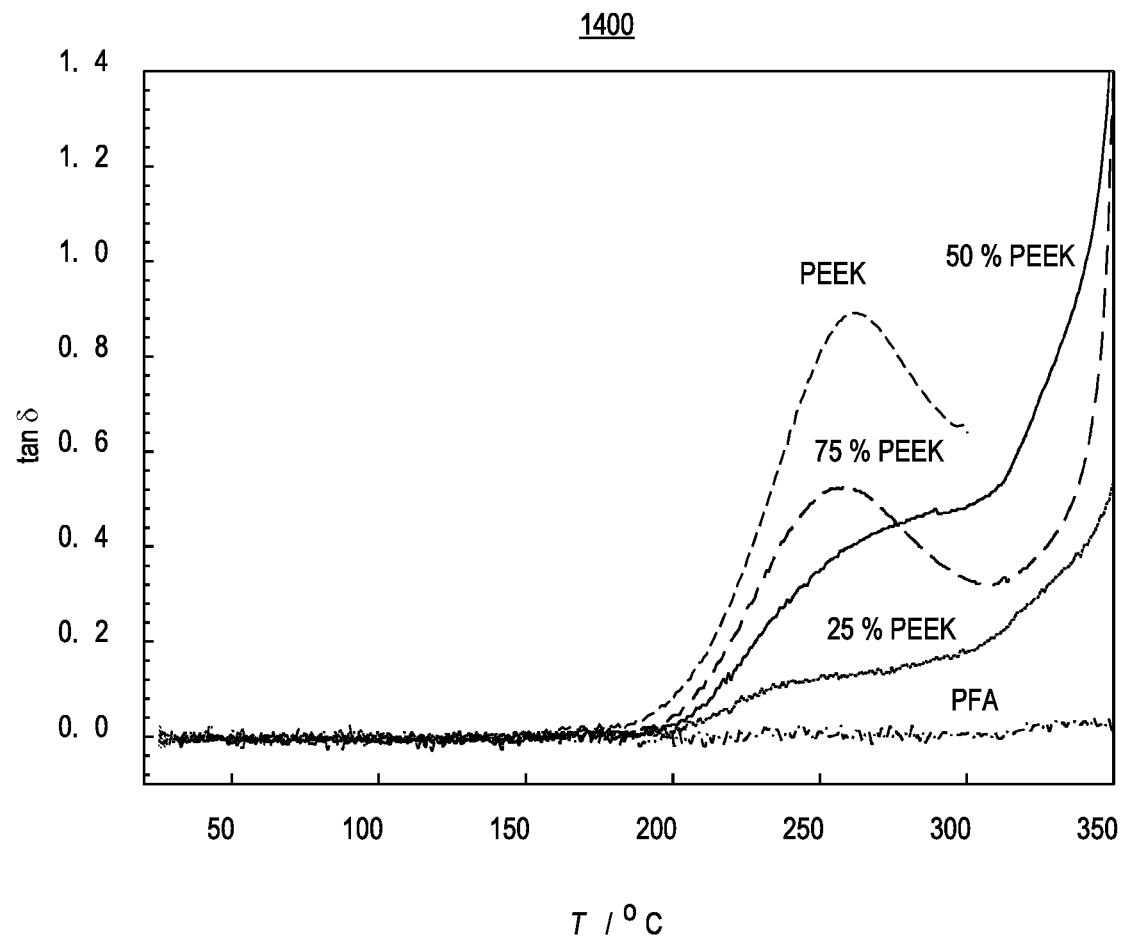
FIG. 14 illustrates an example of a plot of data.

FIGS. 13 and 14 shows plots 1300 and 1400 where the plot 1300 shows temperature dependence of dielectric constant for PEEK/PFA blends and where the plot 1400 shows temperature dependence of dielectric tan δ for PEEK/PFA blends.

As shown in the plots 1300 and 1400, dielectric properties of the PEEK/PFA blends improved with increasing PFA concentration. The plot 1300 shows the dielectric constant versus temperature for different blend compositions where the dielectric constant decreased with increasing PFA content.

As shown in the plot 1400, the dielectric dissipation factor, tan δ, also decreased systematically with increasing the concentration of PFA. An increase in the resistivity with increasing PFA over wide range of temperature was also observed.

As shown in the plot 1300 at temperatures greater than about 200 degrees C., increasing content of PFA lowers the dielectric constant (e.g., relative permittivity). In particular, at temperatures of about 215 degrees C. and higher, PEEK (e.g., greater than about 99 percent PEEK) exhibits a dielectric constant that increases dramatically with temperature. As shown, PFA can reduce that effect such that a dielectric constant may be relatively assured to not exceed about 10 at a temperature of about 250 degrees C. In such an example, a blend can substantially maintain structural properties of PEEK while assuring a lack of runaway with respect to dielectric constant with respect to temperature.

As mentioned, one or more types of ceramic fillers may be included in a polymeric blend to improve thermal conductivity of a composite material.

Figure 15:
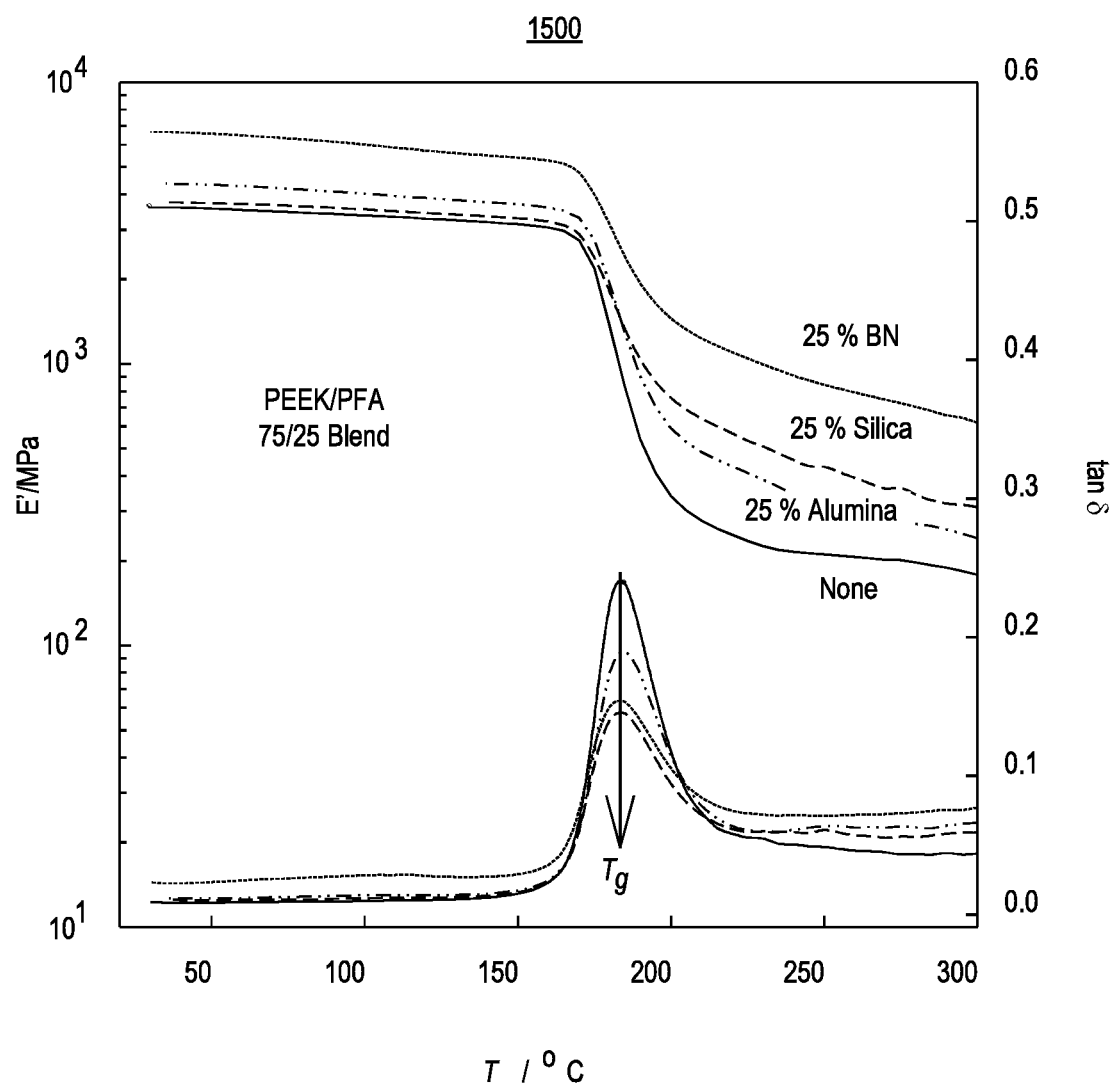
FIG. 15 illustrates an example of a plot of data.

FIG. 15 shows a plot 1500 of data for a PEEK/PFA 75/25 blend. Specifically, the data show the effect of different thermally conductive fillers on the thermomechanical properties. As seen in FIG. 15, the Tg of the PEEK/PFA 75/25 blend does not change noticeably with addition of about 25 percent by weight of the different thermally conductive fillers, which are alumina, silica, and boron nitride (BN). The data indicate that the storage modulus increased by adding the different fillers and that the magnitude of the elevation was found to be a maximum for BN when compared to alumina and silica.

As an example, a method can include tailoring the concentration of one or more thermally conductive fillers to achieve a desired thermal conductivity, which may account for stiffness, for example, to include an amount that does not appreciably increase stiffness.

As an example, a method can include utilizing one or more surface treatments. For example, one or more fillers can be surface treated by one or more techniques such as, for example, plasma, electron beam, chemical functionalization, etc.

As an example, a composite material can be thermally stable after accelerated aging. For example, a composite material was aged at about 225 degrees C. in REDA oil #5 and about 0.1 weight percent water under nitrogen gas at about 1500 psi. DMA data for PEEK/PTFE blends before and after accelerated aging process for 7 and 14 days indicated that Tg remained substantially the same after aging and that a slight increase in the storage modulus occurred, particularly above the Tg.

As an example, a PEEK/fluoropolymer composite material can be thermally stable and exhibit suitable mechanical, thermal, and dielectric properties. Such a composite material can also exhibit water resistance, corrosion resistance, and relatively high thermal conductivity. As an example, such a composite material may be utilized in a cable, a MLE, magnet wire, a slot liner or another component or components that may be used in a downhole environment, etc.

As an example, a polymeric composite material can include PEEK and one or more fluoropolymers and, for example, one or more fillers. In such an example, one or more fillers may be selected to be in a total amount by weight of the polymeric composite material. For example, consider a selected total amount that is in a range from about 1 percent by weight to about 40 percent by weight of a polymeric composite material. As an example, consider a selected total amount that is in a range from about 2 percent by weight to about 30 percent by weight of a polymeric composite material. As an example, consider a selected total amount that is in a range from about 5 percent by weight to about 25 percent by weight of a polymeric composite material. As an example, a filler may be selected from a group of alumina, silica and boron nitride. As an example, a filler may be selected from a group of alumina and boron nitride. As an example, a filler may be selected from a group of alumina and silica. As an example, a filler may be selected from a group of silica and boron nitride.

As an example, a polymeric composite material can include PEEK and one or more fluoropolymers and optionally, for example, one or more fillers. In such an example, the one or more fluoropolymers may be present at at least approximately 5 percent by weight.

As an example, a polymeric composite material that includes PEEK may include ingredients that extend an operational temperature range beyond that of a polymeric material that is 99 percent by weight or more PEEK. For example, such a polymeric composite material may have an operational temperature range that extends to temperatures above about 200 degrees C. where, for example, structural aspects of PEEK are substantially retained. As an example, consider an operational temperature range that extends to about 260 degrees C.

As an example, a polymeric composite material can include PEEK up to about 50 percent by weight, can include PFA up to about 50 percent by weight and can include one or more fillers up to about 30 percent by weight. Such a polymeric composite material may be utilized in one or more types of electrical units that may be submersible electrical units. As an example, a submersible electrical unit can be a submersible electric motor. As an example, a submersible electric motor can be a relatively high amperage electric motor that can benefit from inclusion of a polymeric composite material that includes one or more fillers that increase the thermal conductivity of a polymeric matrix within which the one or more fillers are dispersed.

As an example, a polymeric material can include about 5 percent or more by weight of PFA. For example, such a polymeric material can include PEEK and at least approximately 5 percent by weight PFA. In such an example, the polymeric material may be a polymeric composite material that includes one or more fillers. In such an example, as an example, the weight of the PFA may be at least approximately 5 percent.

As an example, a polymeric composite material can include PEEK up to about 50 percent by weight, can include PFA from about 5 percent by weight up to about 50 percent by weight and can optionally include one or more fillers up to about 30 percent by weight.

As an example, a polymeric material can include PEEK and PFA, PEEK and PTFE or PEEK, PFA and PTFE.

As an example, a method can include providing medium viscosity grades of one or more polymers (e.g., PEEK, PFA, PTFE, etc.). As an example, such grades may correspond to medium molecular weight.

As an example, PEEK and PFA and/or PTFE with thermally conductive ceramic fillers may be mixed and melt extruded at an appropriate temperature and shear rate. In such an example, viscosity of the components, particularly the thermoplastic ones (PEEK and PFA), can effect processing.

As an example, a polymeric composite can include one or more thermally conductive fillers. For example, such a composite can include two or more different types of thermally conductive fillers, which can be different filler materials. For example, consider a polymeric composite material that includes one or more of alumina, silica and boron nitride (BN). As an example, a polymeric composite material may be utilized as an encapsulant (e.g., an encapsulant material) for an electric motor, which may be, for example, a submersible electric motor (e.g., of an ESP).

As an example, a thermally conductive polymer composite material can be of suitable mechanical and dielectric properties to encapsulate portions of an electric motor (e.g., electric motor stator, etc.). As an example, a thermally conductive encapsulant may provide for dielectric insulation, mechanical protection, reduced operating temperature and overheating mitigation of an ESP motor. As an example, such an encapsulant may be utilized to help protects a slot liner and/or magnet wire insulation material from thermal and/or hydrolytic degradation.

As an example, a thermally conductive composite material may include one or more different types of polymeric matrices.

As an example, a polymeric matrix may be an epoxy resin matrix. Epoxy resins, also known as polyepoxides are a class of reactive prepolymers and polymers which contain epoxide groups.

As an example, a polymeric matrix may be formed at least in part via a ring-opening metathesis polymerization (ROMP), which is a type of olefin metathesis chain-growth polymerization. Such reactions can be driven by relief of ring strain in cyclic olefins (e.g. norbornene, cyclopentene, etc.). A catalyst that may be used in a ROMP reaction can include a metal, for example, consider a RuCl$_3$/alcohol mixture, a catalyst, etc. As an example, a catalyst can be a transition metal carbene complex. For example, consider benzylidene-bis(tricyclohexylphosphine)-dichlororuthenium, [1,3-bis-(2,4,6-trimethylphenyl)-2-imidazolidinylidene]dichloro(phenylmethylene)(tricyclohexylphosphine)ruthenium, Dichloro(o-isopropoxyphenylmethylene)(tricyclohexylphosphine)ruthenium(II), and [1,3-Bis-(2,4,6-trimethylphenyl)-2-imidazolidinylidene]dichloro(o-isopropoxyphenylmethylene)ruthenium.

As an example, a polymer may be formed at least in part via ROMP. For example, as a prepolymer component amenable to forming a polymer via ROMP, consider a carbon backbone with functional groups that include at least one oxygen that provides an amount of hydrophilicity may be present along with a hydrocarbon chain (e.g., carbon backbone) that provides an amount of hydrophobicity where at least one functional group may be present on the hydrophobic hydrocarbon chain where such a functional group may participate in ROMP (e.g., via relief of ring stress). In such an example, the prepolymer component may be an ester such as a diester, a triester, etc. (e.g., an n-ester). As an example, consider a triester that includes at least one hydrocarbon chain with a functional group that includes a ring that is amenable to ROMP via relief of ring stress.

As mentioned, a ROMP process can employ a catalyst that can include a metal (e.g., Ru, etc.). As an example, a ROMP process may be utilized to form a copolymer (e.g., via two monomers, three monomers, etc.). For example, consider a scheme for forming a copolymer utilizing a functionalized triester as one of the monomers. As an example, DILULIN™ material (Cargill Inc., Minneapolis, MN) may be utilized, which is a mixture of norbornyl-functionalized linseed oil and cyclopentadiene (CPD) oligomers (e.g., one fraction of modified linseed oil at about 70 percent by weight and another of cyclopentadiene (CPD) oligomers at about 30 percent by weight). In such an example, the norbornene groups are ROMP-reactive. In such a scheme, one or more additional materials can be included such as, for example, one or more of dicyclopentadiene (DCPD) and ethylidenenorbornene (ENB) (e.g., to form a copolymer, which may be a terpolymer, etc.). At room temperature, DCPD is a white crystalline solid. Norbornene is a bridged cyclic hydrocarbon that can be provided as a white solid. Norbornene includes a cyclohexene ring with a methylene bridge between C-3 and C-6; it carries a double bond which induces ring strain. ENB is a bicyclic monomer and intermediate that includes two double bonds, each with a different reactivity. ENB can be produced from vinyl norbornene, which can be made from butadiene and dicyclopentadiene DCPD.

The PubChem open chemistry database lists the following information for DCPD:
  PubChem CID: 6492
  Chemical Names: DICYCLOPENTADIENE; 77-73-6; Cyclopentadiene dimer; Bicyclopentadiene; Biscyclopentadiene; Dicyklopentadien; etc.
  Molecular Formula: $C_{10}H_{12}$
  Molecular Weight: 132.20228 g/mol
  InChI Key: HECLRDQVFMWTQS-UHFFFAOYSA-N The PubChem open chemistry database lists the following information for ENB:
  PubChem CID: 5365543
  Chemical Names: Ethylidenenorbornene; Ethylidene norbornene; 2-Norbornene, 5-ethylidene-; 5-ETHYLIDENE-2-NORBORNENE; 5-Ethylidene-8,9,10-trinorborn-2-ene; CCRIS 4816; etc.
  Molecular Formula: $C_9H_{12}$
  Molecular Weight: 120.19158 g/mol
  InChI Key: OJOWICOBYCXEKR-KRXBUXKQSA-N As an example, a terpolymer may be a DCPD/ENB/DILULIN™ material terpolymer (DED terpolymer). Synthesis of such a terpolymer may proceed at least in part via ROMP. For example, DED terpolymer can be cured via ROMP using transition metal chlorides (e.g., $WCl_6$, hexachloro tungsten) in combination with Lewis-acidic co-catalysts (e.g., $EtAlCl_2$, ethylaluminum dichloride). As an example, a DED terpolymer can also be cured with transition metal complexes (e.g. titanium, tungsten, molybdenum, ruthenium, osmium, etc.) with organic ligands. As an example, cationic polymerization can be accomplished using one or more cationic catalysts, such as, for example, one or more of $BF_3 \cdot O(C_2H_5)_2$ (boron trifluoride ethyl etherate), $B(C_6F_5)_3$ (tris (pentafluorophenyl) borane), MAO (methylalumoxane), $VCl_4$ (tetrachlorovanadium), and $AlBr_3$ (tribromoalumane).

While a terpolymer is mentioned as an example of a copolymer, in general, one or more types of copolymers may be synthesized. For example, consider a DCPD/DILULIN™ material copolymer (DD copolymer) or an ENB/DILU-LIN™ material copolymer (ED copolymer).

As mentioned, a copolymer thermosets can be synthesized from DCPD and/or ENB as well as a functionalized oil (e.g., as in the DILULIN™ material, etc.). Such synthesis can include ring opening metathesis polymerization (ROMP), which may employ a catalyst or catalysts (e.g., 2nd generation Grubbs' catalyst, etc.). The DILULIN™ material includes norbornyl-functionalized linseed oil synthesized by Diels-Alder reaction of linseed oil and DCPD at high temperatures and pressures. The DILULIN™ oil component, a triester, has an average of less than one bicyclic moiety per triglyceride. The low reactivity of the DILU-LIN™ material due to the low number of bicyclic moiety compared to DCPD and ENB can decrease curing kinetics, which can, for example, provide time for one or more filling and/or impregnation process (e.g., before gelation, a transition from liquid to solid). As an example, the relatively low viscosity of DCPD and/or ENB may be controlled by adding different concentrations of the DILULIN™ material.

As an example, a terpolymer or other copolymer formed via use of a functionalized n-ester and ROMP, may exhibit toughness and adhesion to a component or components of an electric motor (e.g., consider magnet wire insulation), for example, via presence of the n-ester structure.

As an example, a polymeric composite material can include one or more of epoxy resin, blends of DCPD/ENB or terpolymers of DCPD/ENB/DILULIN™ material.

As to examples of fillers, consider one or more types of inorganic ceramic fillers such as, for example, boron nitride (BN), silica, alumina, and mixtures of two or more thereof.

As an example, where two or more filler materials are utilized, a polymeric composite material may be referred to as a hybrid filler polymeric composite material. For example, a hybrid structure imparted by use of two or more thermally conductive fillers can provide for desired thermal conductivity and, for example, a decrease in the coefficient of thermal expansion (CTE). Such a hybrid structure may further allow for tailoring viscosity and tailoring toughness.

As an example, inorganic hybrid fillers may be substantially homogenously mixed within a polymeric matrix (e.g., as a low viscosity liquid matrix) under relatively high shear force, for example, using a planetary mixer. As an example, such a method may include in-situ polymerization.

As an example, a viscosity may be relatively low. For example, a relatively low viscosity may be achieved via use of polymeric material such as DCPD/ENB or DCPD/ENB/DILLUIN™ material. Such an approach can allow for fabrication of thermally conductive composites with relatively high concentrations of fillers.

As an example, a polymeric composite material can include polymer and micro/nano-sized fillers (e.g. particles, fibers, platelets, or tubes). Such an approach may enhance properties relative to a neat polymeric matrix. As an example, a filler or fillers may help to tailor one or more of modulus, strength, heat resistance, flame retardancy and gas permeability. As an example, a polymeric composite material may be tailored for one or more of electrical, magnetic and optical properties.

As an example, a method may include tailoring via control of one or more micro-/nanostructural parameters such as, for example, dimension, shape, distribution, volume fraction, and packing arrangement of filler(s). As an example, a filler concentration for substantial change in overall material properties may be referred to as a threshold filler volume fraction. Enhancement of material properties in polymeric composites can be linked to interfacial interactions between polymeric matrix and filler(s) as well as, for example, formation of a network of interconnected filler particles. As an example, a network of interconnected particles may help to improve thermal conductivity of a polymeric matrix.

As to thermally conductive fillers, a polymeric composite material may include, for example, one or more of alumina, aluminum nitride, wollastonite, boron nitride, and silicon carbide.

As to an encapsulation process of an electric motor, such a process may utilize a polymer thermosets. For example, polybutadiene, epoxy, phenolic, acrylic, etc. may be utilized to provide mechanical protection against shock and/or vibration and to help protect magnet wire insulation materials and slot liner from degradation.

In downhole oil industry applications, an electric submersible pump may be used in an environment that may be high temperature and high pressure (HTHP) and include one or more types of corrosive fluids and/or gases (e.g., hydrogen sulfide ($H_2S$), carbon dioxide ($CO_2$), etc.).

An ESP encapsulant material can be specified to possess suitable dielectric properties, low CTE, high glass transition temperature, high storage modulus at operating temperature, suitable toughness, suitable thermal stability and suitable stability against hydrolytic degradation as well as, for example, relatively low viscosity before curing (e.g., for flow, filling, gas evacuation, etc.).

High thermal conductivity of an ESP encapsulant can be beneficial where operating temperatures are in excess of about 200 degrees C. (e.g., greater than about 400 degrees F.). As an example, a thermally conductive encapsulant can help to mitigate risk of overheating and, for example, potentially reduce operating temperature.

As mentioned, a polymeric composite material can include a selected polymer matrix that may include, for example, copolymers of dicyclopentadiene (DCPD) and ethylidene-norbornene (ENB), a terpolymer thermosets of DCPD/ENB/DILULIN™ material (e.g., functionalized linseed oil), and/or an epoxy resin. As an example, inorganic thermally conductive fillers may be selected from boron nitride, silica, alumina, and mixtures of two or more thereof. As an example, a hybrid structure of inorganic fillers may be utilized to form an interconnected network that can improve thermal conductivity, for example, compared to a polymeric matrix that includes a single type of inorganic filler.

To improve the thermal conductive and decrease the CTE of a polymeric matrix, a volume of thermally conductive fillers can be substantially homogenously mixed with a polymeric matrix that is in a flowable state (e.g., a liquid state of suitable viscosity).

As an example, a method can include adding an amount of thermally conductive fillers where effect on viscosity of the polymeric matrix in the flowable state is relatively small. For example, viscosity of a filled composite can be targeted to be sufficiently low to allow ease of filling/impregnation processes with respect to one or more electric motor structures (e.g., consider relatively narrow ESP slot stators). As an example, a viscosity may be targeted to be sufficiently low prior to curing to allow for formation of a relatively homogenous encapsulant that does not entrain a substantial amount of air (e.g., relatively free of air bubbles or other gas bubbles). For example, viscosity with respect to time and temperature may be suitable to allow for gas bubbles to rise, optionally under influence of a vacuum, such that a set encapsulant is relatively free from voids, etc.

As an example, viscosities of DCPD/ENB and DCPD/ENB/DILULIN™ material blends tend to be relatively low even where a method includes adding an amount of thermally conductive fillers up to about 50 percent by volume. Such examples of blends may be lower in viscosity and suitable for relatively large amounts of fillers compared to an epoxy resin. Thus, where an epoxy resin is utilized, the amount of fillers may be determined at least in part via effect of such thermally conductive fillers on the viscosity of the epoxy resin (e.g., as a function of filler concentration at different temperatures).

Figure 16:
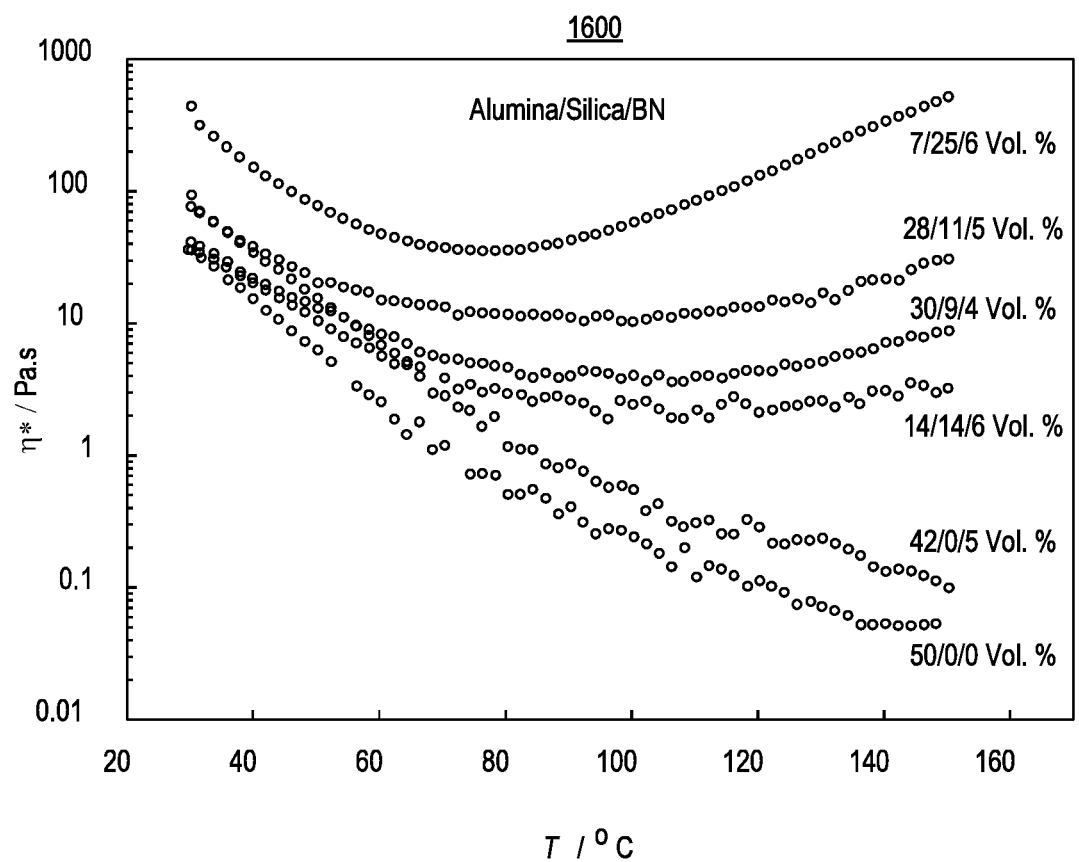
FIG. 16 illustrates an example of a plot of data.

FIG. 16 shows an example plot 1600 of temperature dependence of complex viscosity at about a 2 degrees C. per minute heating rate and at about 1 radians per second angular frequency for epoxy resins with different volume percentages of hybrid thermally conductive fillers without hardener (e.g., without curing).

As shown in the plot 1600, viscosity decreases with increasing temperature due to increased mobility of polymer chains at higher temperatures. As shown in the plot 1600, mixtures with about 50 percent by volume alumina and 42/5 alumina/boron nitride percent by volume tend to have relatively low viscosities at the higher temperatures.

As an example, a polymeric composite material can include an amount of alumina filler that may be in excess of about 30 percent by volume and optionally an amount of boron nitride (BN) that may be in a range from about 0.1 percent by volume to about 10 percent by volume. As an example, a polymeric composite material can include an amount of alumina filler that may be in excess of about 30 percent by volume without including another type of thermally conductive filler. As an example, a polymeric composite material may be about 50/0/0 percent by volume alumina/silica/BN per the example of FIG. 16 or may be about 42/0/5 percent by volume alumina/silica/BN per the example of FIG. 16. One or more of such examples may be utilized as an ESP encapsulant where, for example, suitable amount of hardener, etc. is included. As an example, a hybrid filler may be an alumina and boron nitride (BN) hybrid filler.

Figure 17:
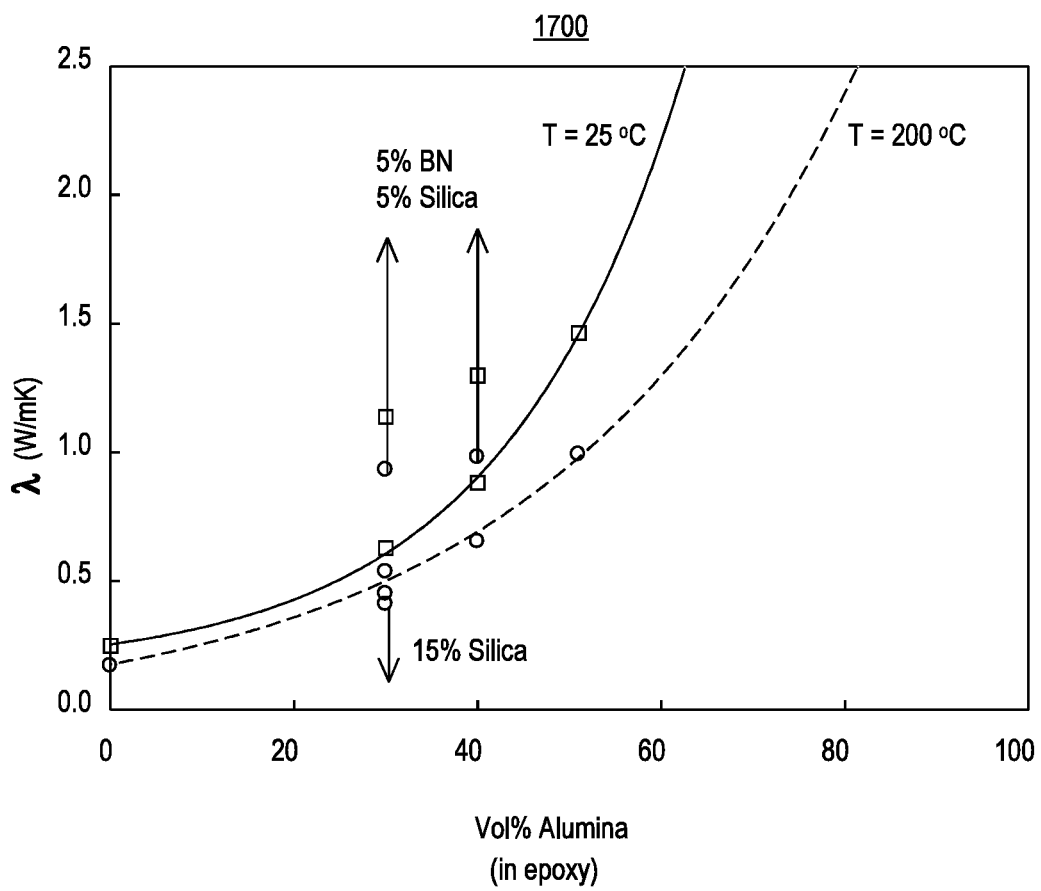
FIG. 17 illustrates an example of a plot of data.
Figure 18:
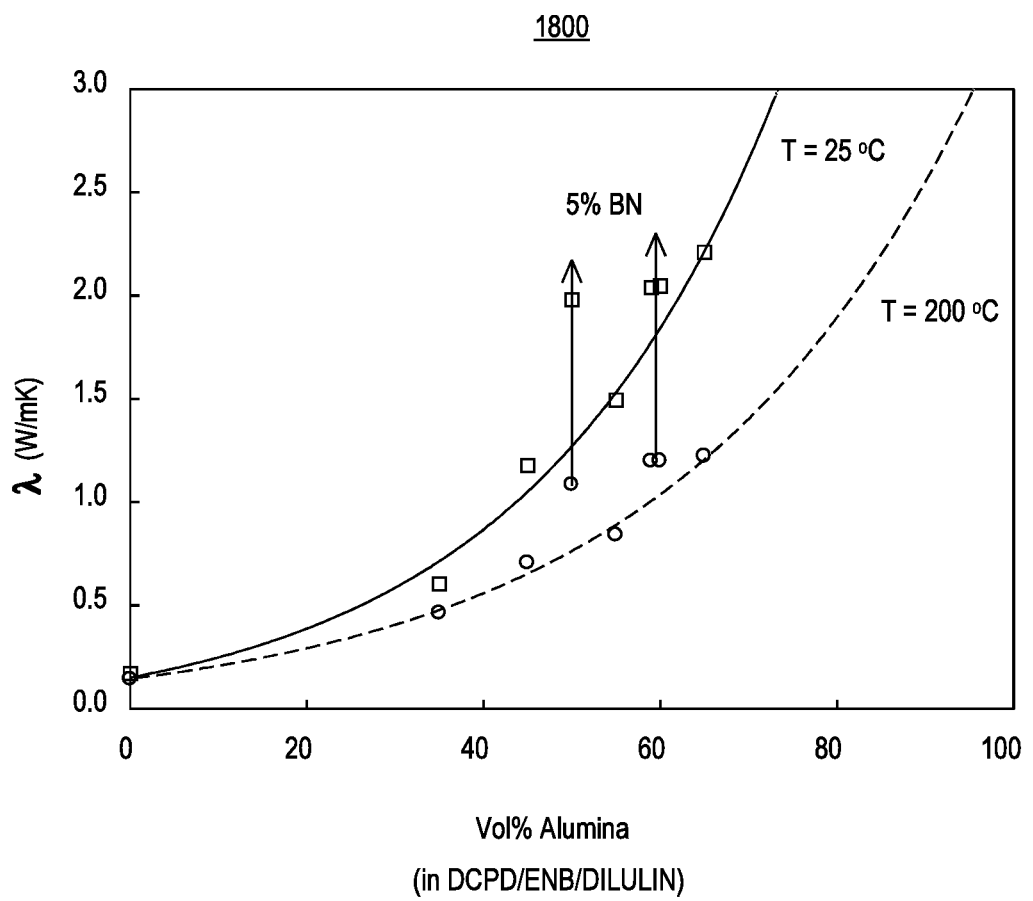
FIG. 18 illustrates an example of a plot of data.

FIGS. 17 and 18 show example plots 1700 and 1800 of data as to composition dependence of thermal conductivity at about 25 degrees C. and at about 200 degrees C. for epoxy resins (the plot 1700) and DCPD/ENB/DILULIN™ material composites (the plot 1800). As shown in the plots 1700 and 1800, thermal conductivity increases in a relatively exponentially manner with increasing volume percent of alumina. As shown in the plots 1700 and 1800, hybrid fillers (e.g., two or more of alumina, silica, and BN) can increase thermal conductivity more than the same volume percent of alumina alone (see, e.g., the arrows in the plots 1700 and 1800). A polymeric composite with a hybrid filler system can allow for building interconnected structure and enhance thermally conductivity when compared to use of a single filler (e.g., alumina).

Figure 19:
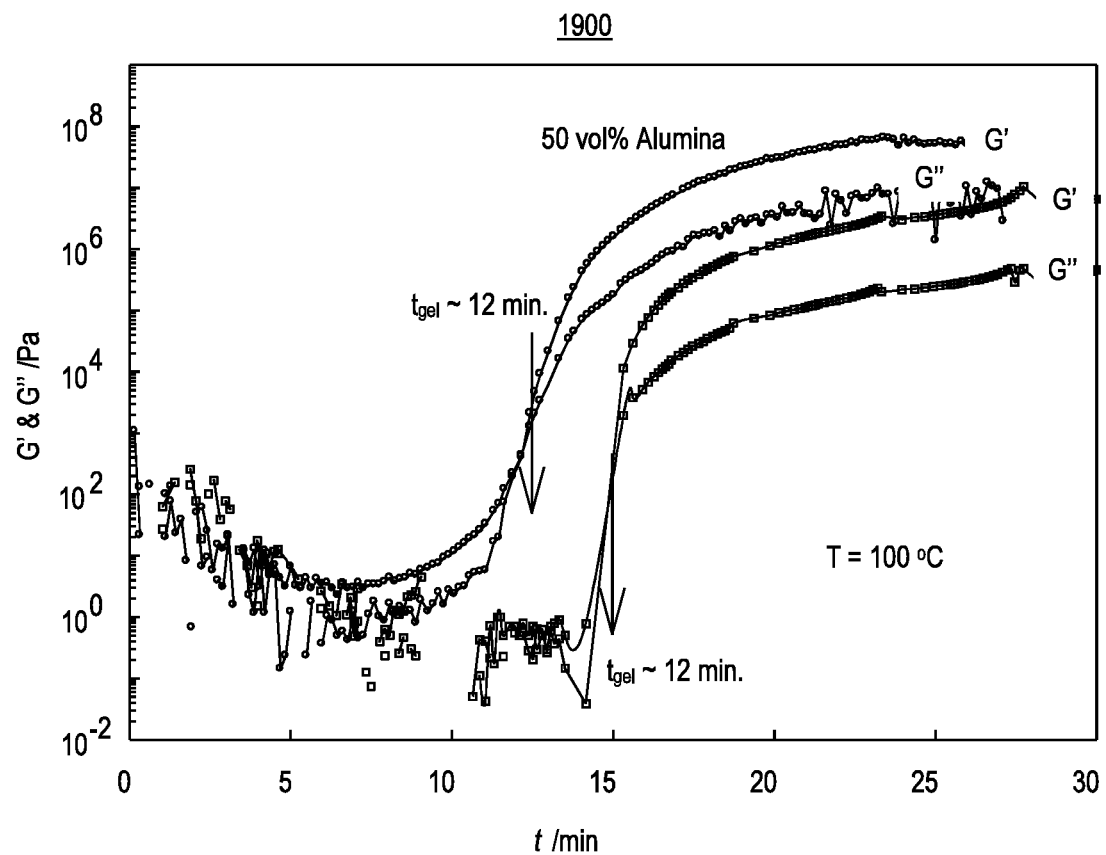
FIG. 19 illustrates an example of a plot of data.
Figure 20:
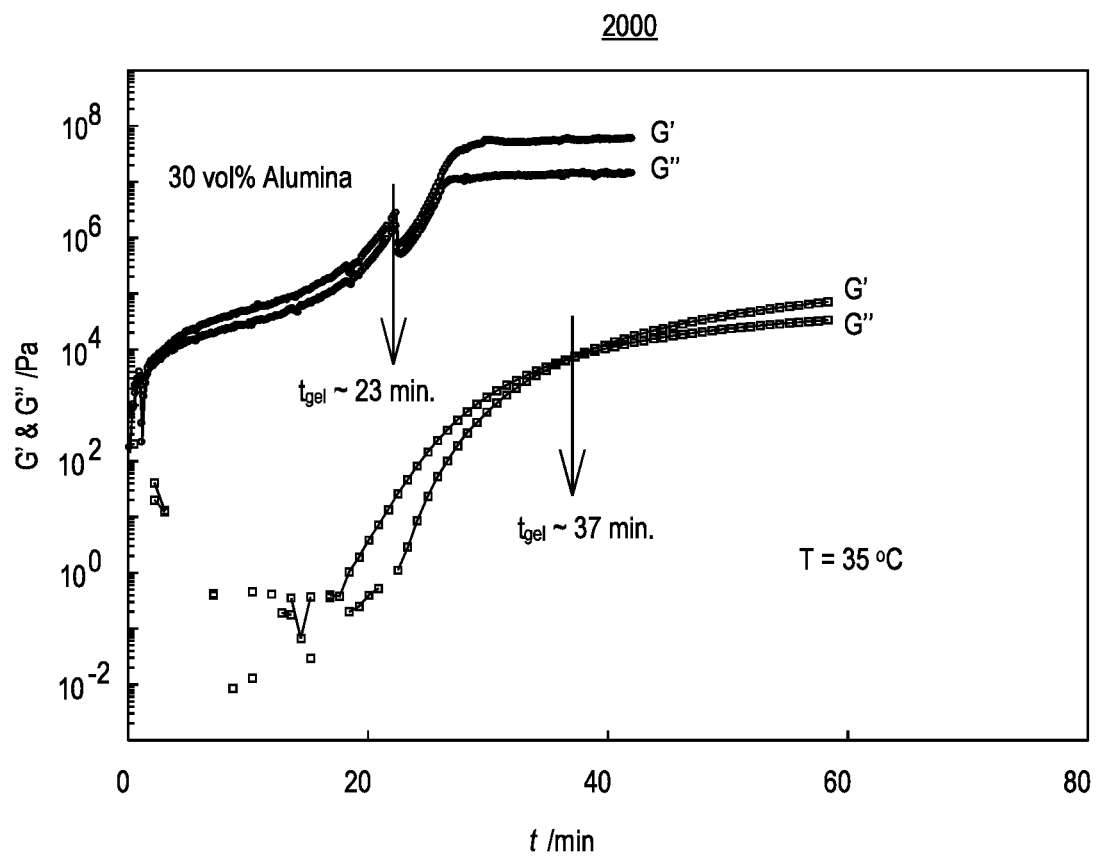
FIG. 20 illustrates an example of a plot of data.

FIGS. 19 and 20 show example plots 1900 and 2000 as to effect of filler on curing kinetics of epoxy resins composites (the plot 1900) and DCPD/ENB/DILULIN™ material composites (the plot 2000). The plot 1900 of FIG. 19 shows curing time dependence of dynamic shear moduli (elastic modulus, G' and viscous modulus, G") at about 100 degrees C. As shown in the plot 1900, gel time may be calculated from the cross over point between G' and G" (see arrows). As indicated in the plot 1900, gel time decreases from about 15 min for unfilled resin to about 12 min for a composite with about 50 percent by volume of alumina.

As shown in the plot 2000 of FIG. 20, a decrease in gel time occurs for DCPD/ENB/DILULIN™ material when loaded with about 30 percent by volume alumina (e.g., gel time decreases from about 37 min to about 23 min at about 35 degrees C.).

In the systems corresponding to data of the plots 1900 and 2000, values of G' and G" for filled composites are higher than those of unfilled ones at a substantially constant curing time.

Figure 21:
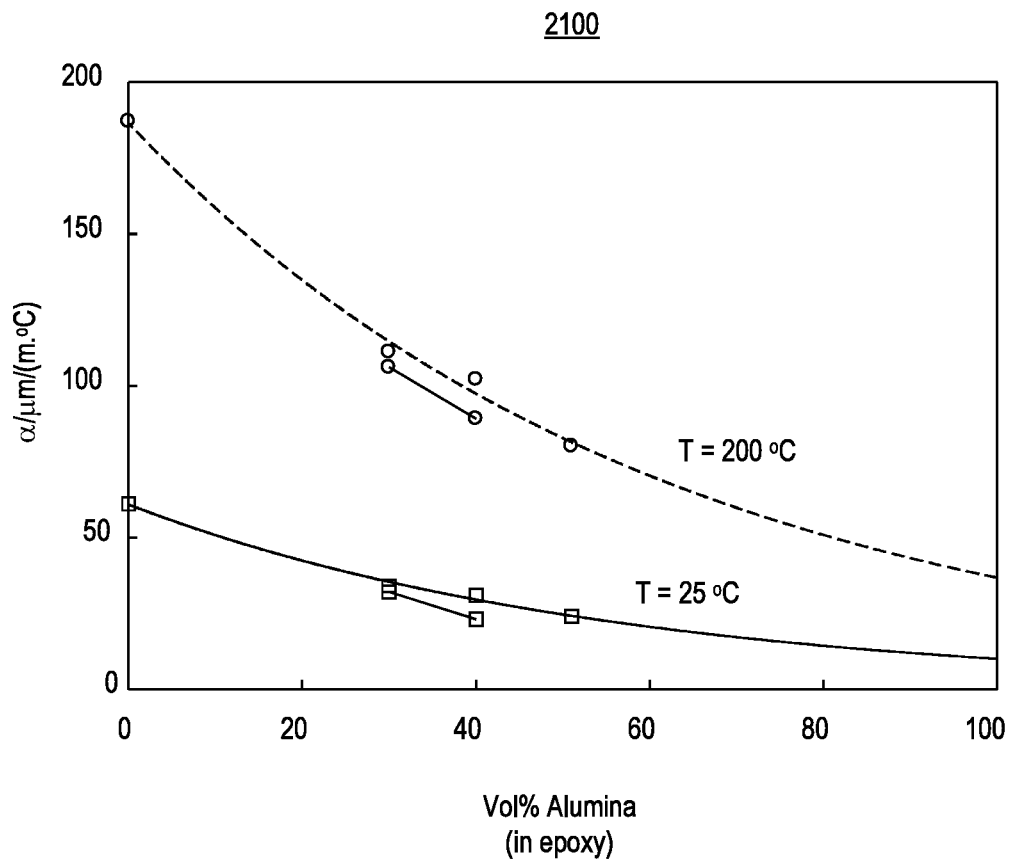
FIG. 21 illustrates an example of a plot of data.
Figure 22:
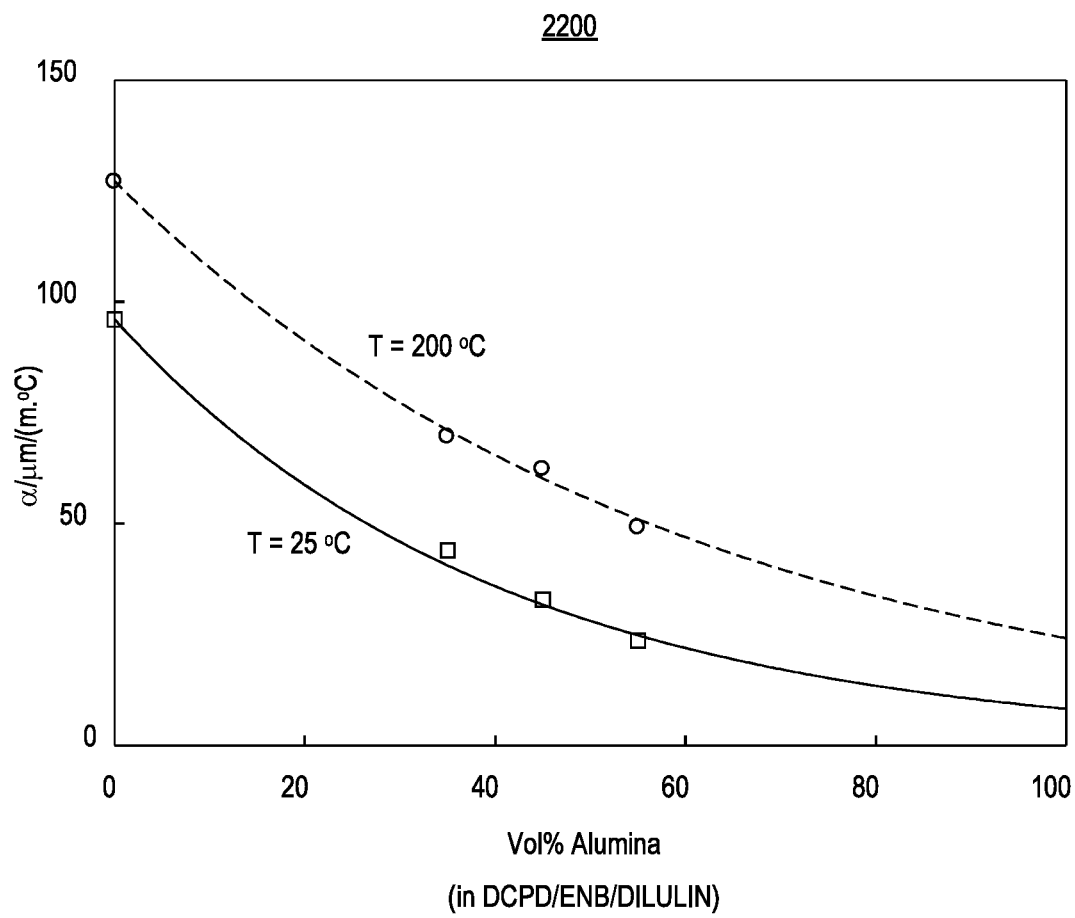
FIG. 22 illustrates an example of a plot of data.

FIGS. 21 and 22 show example plots 2100 and 2200 of data for effect of inorganic fillers on both CTE and dielectric properties of polymeric matrices. In the plot 1900, data show CTE as a function of alumina volume percent for epoxy resin composites at about 25 degrees C. and at about 200 degrees C. As shown in the plot 2100, the value of CTE tends to be quite high at about 200 degree C. compared to the corresponding value at about 25 degrees C. Further, CTE decreases in a relatively exponential manner with increasing alumina concentration. As to the data of the plot 2200, CTE values for DCPD/ENB/DILULIN™ material composites tend to be lower than those of the epoxy resin composites per the data of the plot 2100.

Figure 23:
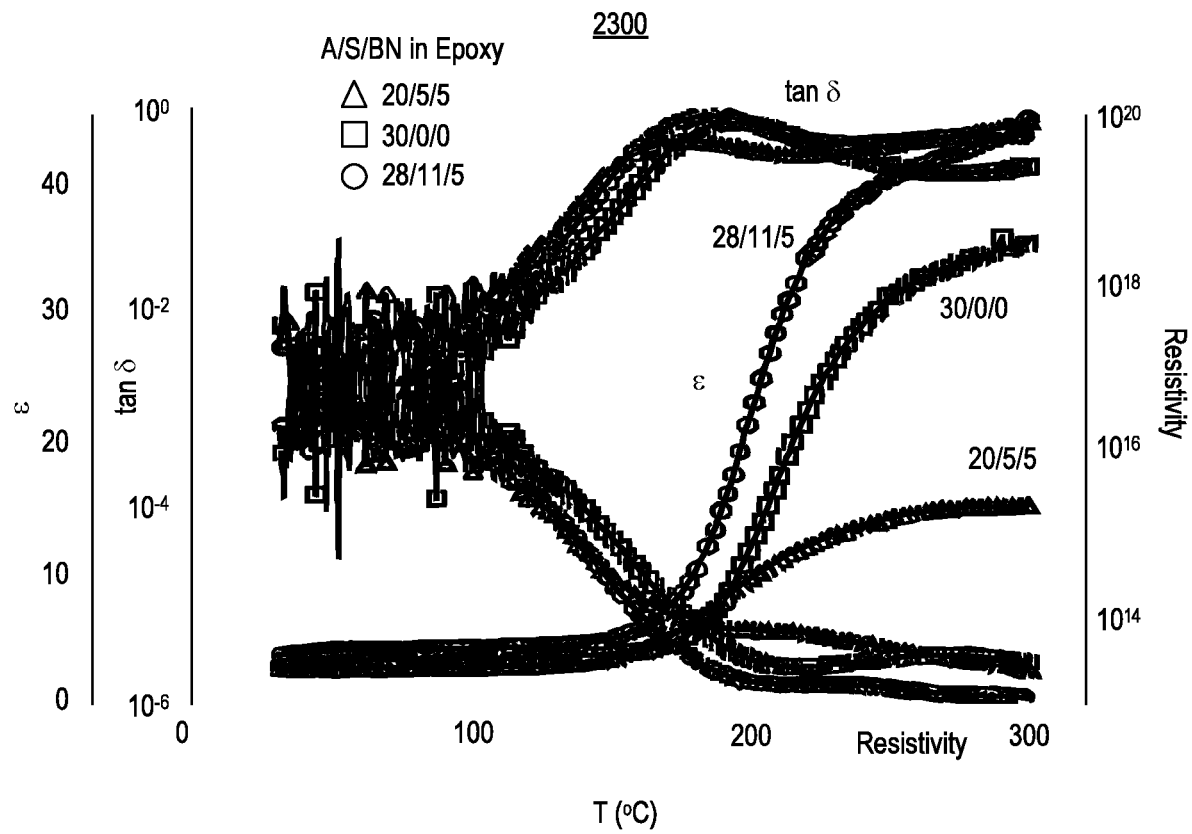
FIG. 23 illustrates an example of a plot of data.
Figure 24:
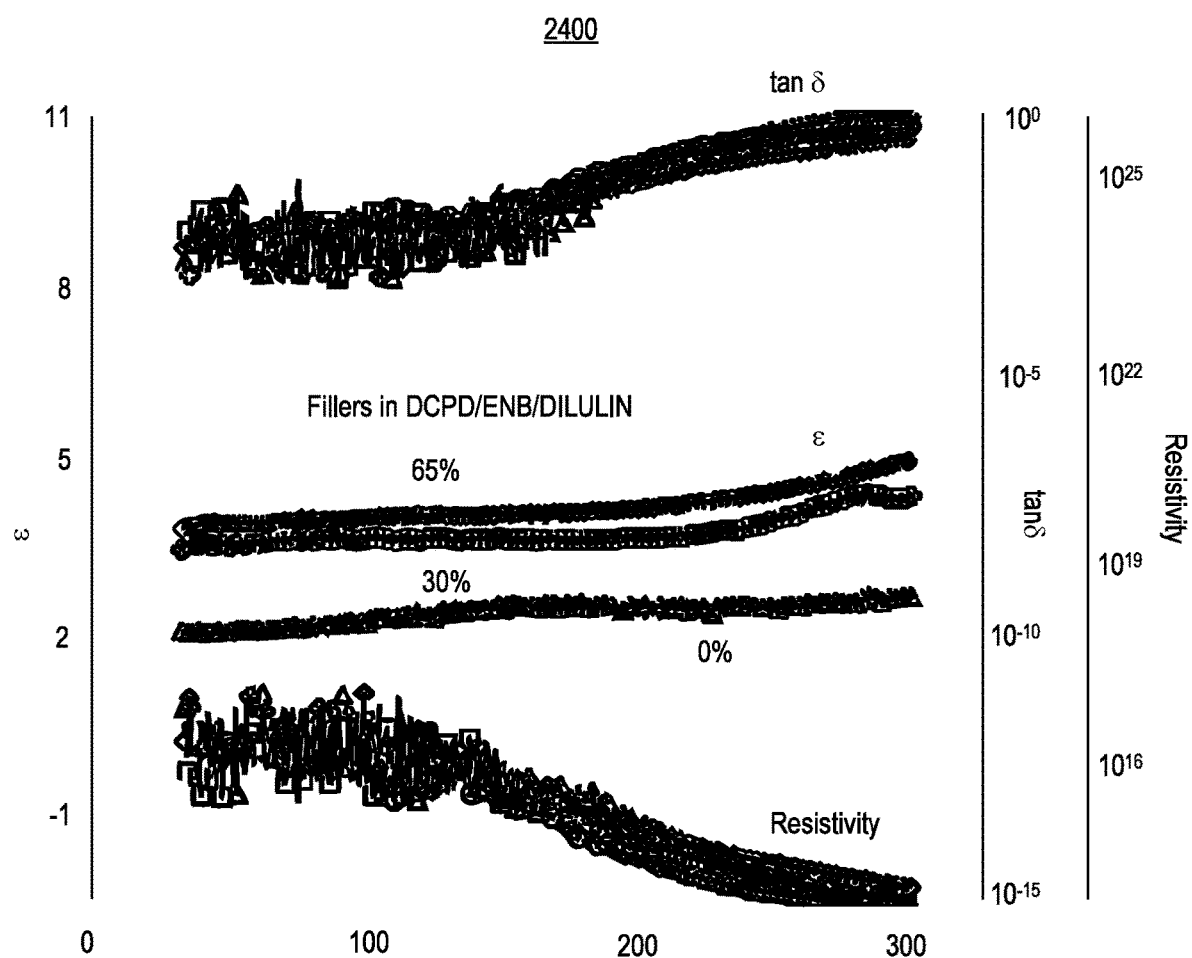
FIG. 24 illustrates an example of a plot of data.

FIGS. 23 and 24 show example plots 2300 and 2400 of data for dielectric properties of epoxy resin composites with different inorganic filler compositions at different temperatures (the plot 2300) and dielectric properties of DCPD/ENB/DILULIN™ material composites with different inorganic filler compositions at different temperatures (the plot 2400). As shown in the plots 2300 and 2400, the dielectric constant and tan δ increase as temperature increases while the resistivity decreases as temperature increases.

As indicated in the plot 2300, alumina can increase the dielectric constant of epoxy resin greater than BN. The dielectric constant decreases from approximately 32 for a composite with about 30 percent by volume alumina to about 15 for a composite with about 25/5 alumina/BN percentages by volume (e.g., a total of about 30 percent by volume of fillers) at about 250 degrees C.

As to encapsulants, the dielectric properties of DCPD/ENB/DILULIN™ material composites tend to be better than those of epoxy resin composites. As shown in the plot 2400, the dielectric constant for DCPD/ENB/DILULIN™ material composites tends to be much lower than those of the epoxy resin, as shown in the plot 2300, over a relatively wide range of temperatures even for a relatively high load of filler up to about 65 percent by volume alumina.

As an example, a polymeric composite material can exhibit a relatively high thermal conductivity, a relatively low viscosity (e.g., in a liquid state), relatively controllable curing kinetics, a relatively low CTE, a relatively high dielectric breakdown, a relatively low resistivity, a relatively low dissipation factor, a relatively high water resistance, as well as a relatively high glass transition temperature, suitable toughness, and a relatively high storage modulus at relatively high temperatures. As an example, such a polymeric composite material may be used in one or more types of downhole oil industry applications, for example, as a dielectric material, an electric motor varnish, an electric motor encapsulant, etc.

As an example, a polymeric composite material can include an amount of one or more fillers by volume in a range from about 20 percent by total volume to about 50 percent by total volume. As an example, a method may include mixing polymeric materials and one or more fillers in a manner where viscosity is controlled or predetermined to be within a desired range, which may correspond to a range suitable for use of the mixture as an encapsulant. For example, the mixture may be in a liquid state suitable for being disposed in an electric motor housing prior to hardening.

As an example, a submersible component can include a conductor; and a polymeric material disposed about at least a portion of the conductor where the polymeric material includes at least approximately 50 percent by weight polyether ether ketone (PEEK) and at least 5 percent by weight perfluoroalkoxy alkanes (PFA) (e.g., perfluoro (alkoxy alkane)). In such an example, the polymeric material can include or be a polymeric composite material that includes a thermally conductive filler that has a thermal conductivity greater than the polymeric material. For example, consider a thermally conductive filler that includes alumina, boron nitride or alumina and boron nitride.

As an example, a submersible component can include polymeric material with a dielectric constant of less than approximately 10 at a temperature of approximately 250 degrees C.

As an example, a submersible component can include a conductor; and a polymeric material disposed about at least a portion of the conductor where the polymeric material includes at least approximately 50 percent by weight polyether ether ketone (PEEK) and at least 5 percent by weight perfluoroalkoxy alkanes (PFA) (e.g., perfluoro (alkoxy alkane)). As an example, consider the component being an electric submersible pump power cable, an electric submersible pump motor lead extension (MLE), an electric submersible pump electric motor slot liner or an electric submersible pump magnet wire insulation.

As an example, a submersible component may be formed at least in part from a polymeric material that is a melt extrudable polymeric material, which may be, for example, a polymeric composite material.

As an example, a submersible electrical unit can include an electrically conductive winding; and a polymeric composite material disposed about at least a portion of the electrically conductive winding where the polymeric composite material includes polymeric material at at least approximately 40 percent by volume and one or more fillers at at least approximately 10 percent by volume. In such an example, the one or more fillers can include alumina and/or boron nitride. For example, consider fillers that include alumina and boron nitride, which may optionally be of different shapes. As an example, differently shaped fillers may pack in a polymeric matrix in a manner that differs from similarly shaped fillers (e.g., or a single filler of a particular shape).

As an example, a submersible electrical unit can include an electrically conductive winding; and a polymeric composite material disposed about at least a portion of the electrically conductive winding where the polymeric composite material includes polymeric material at at least approximately 40 percent by volume and one or more fillers at at least approximately 10 percent by volume where the polymeric material includes dicyclopentadiene (DCPD), where the polymeric material includes ethylidenenorbornene (ENB) and/or where the polymeric material includes norbornyl-functionalized linseed oil (e.g., DILULIN™ material). As an example, a polymeric material can include dicyclopentadiene, ethylidenenorbornene and norbornyl-functionalized linseed oil and can serve as a matrix for dispersion of one or more thermally conductive fillers therein (e.g., consider one or more of alumina and boron nitride).

As an example, a submersible electrical unit can be a submersible electric motor. As an example, a polymeric composite material can be an encapsulant (e.g., for a stator or other component of a submersible electrical unit). As an example, a polymeric composite material can be a varnish (e.g., for at least a portion of a submersible electrical unit).

As an example, a submersible component can include a conductor; and a polymeric material disposed about at least a portion of the conductor where the polymeric material includes at least approximately 50 percent by weight polyether ether ketone and at least 5 percent by weight perfluoroalkoxy alkanes and a submersible electrical unit can include an electrically conductive winding; and a polymeric composite material disposed about at least a portion of the electrically conductive winding where the polymeric composite material includes polymeric material at at least approximately 40 percent by volume and one or more fillers at at least approximately 10 percent by volume. In such an example, the submersible component may be part of and/or operatively coupled to the submersible electrical unit. For example, consider a cable as a submersible component that is operatively coupled to an electric motor that is part of a submersible electrical unit (e.g., an ESP motor, etc.).

As an example, equipment 150 and/or equipment 170 of FIG. 1 may optionally include a submersible component that includes a conductor; and a polymeric material disposed about at least a portion of the conductor where the polymeric material includes at least approximately 50 percent by weight polyether ether ketone and at least 5 percent by weight perfluoroalkoxy alkanes.

As an example, equipment 150 and/or equipment 170 of FIG. 1 may optionally be or include a submersible electrical unit can include an electrically conductive winding; and a polymeric composite material disposed about at least a portion of the electrically conductive winding where the polymeric composite material includes polymeric material at at least approximately 40 percent by volume and one or more fillers at at least approximately 10 percent by volume.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to a sensing process, an injection process, drilling process, an extraction process, an extrusion process, a deposition process, a pumping process, a heating process, etc.

As an example, a method may be computer-controlled or otherwise controlled at least in part via processor-executable instructions stored in a storage medium or storage media. As an example, consider control of a mixing process, a weighing process, an extrusion process, a filling process, a varnishing process, an encapsulation process, etc. As an example, consider control of a method such as the method 810 and/or the method 850 of FIG. 8. As an example, a portion of the method 810 and/or a portion of the method 850 may be controlled via a computing system.

Figure 25:
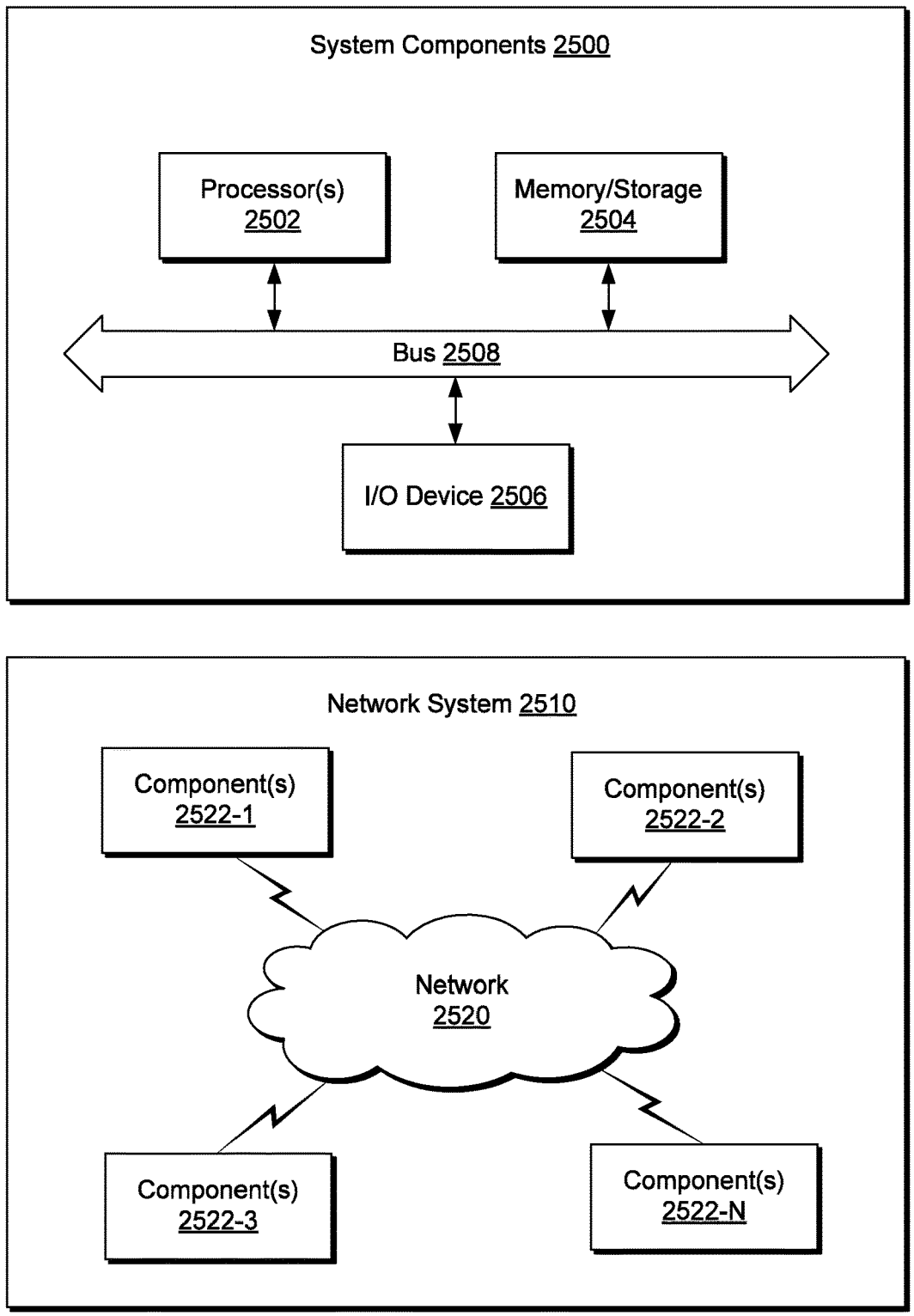
FIG. 25 illustrates example components of a system and a networked system.

FIG. 25 shows components of a computing system 2500 and a networked system 2510. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A submersible electrical unit comprising:
an electrically conductive winding; and
a polymeric composite material disposed about at least a portion of the electrically conductive winding, wherein the polymeric composite material comprises polymeric material at at least approximately 40 percent by volume and fillers at at least approximately 10 percent by volume, wherein the fillers comprise inorganic hybrid fillers substantially homogenously mixed within a polymeric matrix.

2. The submersible electrical unit of claim 1, wherein the polymeric matrix is a low viscosity liquid matrix.

3. The submersible electrical unit of claim 2, wherein the relatively low viscosity is achieved using DCPD/ENB or DCPD/ENB/DILLUIN™.

4. The submersible electrical unit of claim 1, wherein the inorganic hybrid fillers substantially homogenously being mixed within a polymeric matrix comprises using in-situ polymerization.

5. The submersible electrical unit of claim 1, wherein the inorganic hybrid fillers substantially homogenously being mixed within a polymeric matrix comprises using a planetary mixer.

6. The submersible electrical unit of claim 1, wherein the inorganic hybrid fillers substantially homogenously being mixed within a polymeric matrix comprises using relatively high shear force.

7. The submersible electrical unit of claim 1 comprising a submersible electric motor.

8. A submersible electrical unit comprising:
an electrically conductive winding; and
a polymeric composite material disposed about at least a portion of the electrically conductive winding, the polymeric composite material comprising:
one or more amphiphilic molecules;
one or more fillers by volume in a range from 20 percent by total volume to 50 percent by total volume, wherein the one or more fillers comprise inorganic hybrid fillers substantially homogenously mixed within a polymeric matrix under relatively high shear force using a planetary mixer; and
an amount of boron nitride filler in a range from about 0.1 percent by volume to about 10 percent by volume.

9. The submersible electrical unit of claim 8, wherein the polymeric composite material is about 42 percent by volume alumina filler and about 5 percent by volume boron nitride filler.

10. The submersible electrical unit of claim 8 comprising a submersible electric motor.

11. The submersible electrical unit of claim 8 wherein the inorganic hybrid fillers substantially homogenously being mixed within a polymeric matrix comprises using in-situ polymerization.

12. The submersible electrical unit of claim 8 wherein the polymeric composite material comprises a varnish or an encapsulant.

13. The submersible electrical unit of claim 8, wherein the one or more amphiphilic molecules are Ring-Opening Metathesis Polymers (ROMP) capable.

14. The submersible electrical unit of claim 8, wherein the amphiphilic molecules comprise at least one of norbornyl-functional groups and cyclopentadiene-functional groups.

15. The submersible electrical unit of claim 8, wherein the polymeric material comprises dicyclopentadiene, ethylidenenorbornene and norbornyl-functionalized linseed oil.

16. A submersible component comprising:
a conductor; and
a polymeric composite material disposed about at least a portion of the conductor, wherein the polymeric composite material comprises fillers and polymeric material at least approximately 50 percent by weight polyether ether ketone (PEEK) and at least 5 percent by weight perfluoroalkoxy alkanes (PFA), the fillers comprising a first filler having a relatively low surface area, and a second filler having a higher aspect ratio than the first filler, the first filler comprising a greater percentage by volume of the polymeric composite material than the second filler.

17. The submersible component of claim 16, wherein the polymeric material comprises one or more amphiphilic molecules.

18. The submersible component of claim 16, wherein the fillers comprise inorganic hybrid fillers substantially homogenously mixed within a polymeric matrix under relatively high shear force using a planetary mixer.

19. The submersible component of claim 18, wherein the inorganic hybrid fillers substantially homogenously being mixed within a polymeric matrix comprises using in-situ polymerization.

20. The submersible component of claim 16, wherein the polymeric material comprises dicyclopentadiene, ethylidenenorbornene and norbornyl-functionalized linseed oil.

* * * * *